United States Patent
Yuasa et al.

(10) Patent No.: US 6,614,203 B2
(45) Date of Patent: Sep. 2, 2003

(54) ELECTRICAL CONNECTION BOX

(75) Inventors: Eriko Yuasa, Yokkaichi (JP); Shuji Yamakawa, Yokkaichi (JP); Hiroki Hirai, Nagoya (JP); Kouji Oota, Nagoya (JP)

(73) Assignees: Autonetworks Technologies, Ltd., Nagoya (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/161,607

(22) Filed: Jun. 5, 2002

(65) Prior Publication Data

US 2002/0180272 A1 Dec. 5, 2002

(30) Foreign Application Priority Data

Jun. 5, 2001 (JP) .......................................... 2001-169863

(51) Int. Cl.[7] .............................. H02J 7/00; H02B 1/26
(52) U.S. Cl. ....................................... 320/104; 361/641
(58) Field of Search .............................. 320/104, 107; 361/104, 600, 626, 642, 646, 833, 835, 837, 824, 641; 307/10.7, 112, 116, 125, 130, 131, 149; 337/194, 186

(56) References Cited

U.S. PATENT DOCUMENTS

| | | | | |
|---|---|---|---|---|
| 4,914,314 A | * | 4/1990 | Hirtz .......................... | 307/10.3 |
| 5,430,619 A | * | 7/1995 | Lindenbaum ................ | 361/611 |
| 5,818,236 A | * | 10/1998 | Sone et al. ................... | 324/509 |
| 5,820,413 A | * | 10/1998 | Yamada et al. .............. | 439/621 |
| 5,831,228 A | * | 11/1998 | Kuki et al. ................ | 200/16 E |
| 6,456,187 B2 | * | 9/2002 | Konda et al. ................ | 337/194 |

FOREIGN PATENT DOCUMENTS

| | | |
|---|---|---|
| JP | A 9-147674 | 6/1997 |
| JP | A 9-147734 | 6/1997 |
| JP | A 9-223439 | 8/1997 |

* cited by examiner

Primary Examiner—Edward H. Tso
Assistant Examiner—Pia F Tibbits
(74) Attorney, Agent, or Firm—Oliff & Berridge PLC

(57) ABSTRACT

An electrical connection box includes a protection apparatus attachment recess. The protection apparatus attachment recess accommodates a power supply breaker apparatus. The power supply breaker apparatus includes a fixed member and a movable member. The fixed member is attached to an box main body. The movable member is attached to the fixed member in an attachable and detachable manner. When the movable member is detached from the fixed member, the power supply breaker apparatus breaks the supply from a battery to an electrical load.

16 Claims, 20 Drawing Sheets

ELECTRICAL CONNECTION BOX

BACKGROUND OF THE INVENTION

1. Field of the Invention

The present invention relates to an electrical connection box and, in particular, to an attachment structure for a protection apparatus for breaking the supply of electrical power from an in-vehicle power supply to electrical loads in the case of maintenance of the electrical loads.

2. Description of the Related Art

Conventionally, an automobile has many electrical loads such as a radio receiver and a navigation apparatus. In particular, recently, such electrical loads in vehicles have continued to increase in number and amount. In order to satisfy such an increase in the power capacity requirements for electrical loads, a 36-V battery is also used in addition to a conventional 12-V battery in some cases.

During maintenance work of these electrical loads, the situation where voltage from the battery is still applied to the electrical loads is not preferable. Thus, in the prior art, before maintenance work of electrical loads, wires, etc., connected to the battery need to be removed in order to break the supply of electrical power to the electrical loads.

In order to resolve the problem, a protection apparatus for breaking the supply of electrical power from a battery to electrical loads in the case of maintenance of the electrical loads has been proposed to be attached in the vicinity of the battery via an attachment structure such as a connector. Such a protection apparatus is disclosed in Japanese Unexamined Patent Publication Nos. Hei 9-223439, Hei 9-147734, and Hei 9-147674.

Such a protection apparatus has been installed in an independent manner in the engine compartment. Nevertheless, with the sophistication of vehicles, the engine compartment has been recently equipped with an increasing number of components. This has reduced the space available for installing the protection apparatus in the engine compartment, and has thereby caused difficulty in installing the protection apparatus in the engine compartment. Further, an attachment structure is necessary for fixing the protection apparatus. This has caused an increase in costs necessary for installing the protection apparatus. Furthermore, the protection apparatus is installed intact in the engine compartment. This has caused difficulty in ensuring water proofing properties of the protection apparatus.

SUMMARY OF THE INVENTION

The invention has been devised in consideration of the above-mentioned problems. A first object of the invention is to provide an electrical connection box capable of installing a protection apparatus securely. A second object of the invention is to provide an electrical connection box capable of reducing costs necessary for installing the protection apparatus. A third object of the invention is to provide an electrical connection box capable of ensuring the water-proofing properties of the protection apparatus.

In order to achieve the above object, the first aspect of the invention is an electrical connection box comprising a protection apparatus attachment section for accommodating a protection apparatus which includes a fixed member attached to a box main body and a movable member attached to said fixed member in an attachable and detachable manner, and which when said movable member is detached from said fixed member, breaks the supply of electrical power from an in-vehicle power supply to an electrical load.

The second aspect of the invention is an electrical connection box according to the first aspect of the invention, wherein a bus bar for engaging with an electrically conductive member provided in said electrical connection box and thereby electrically connecting said in-vehicle power supply to a discharge resistor is provided in a protruded manner on an outer side surface of said fixed member.

The third aspect of the invention is an electrical connection box according to the first or second aspect of the invention, wherein said protection apparatus attachment section is composed of a protection apparatus attachment recess for accommodating said protection apparatus.

The fourth aspect of the invention is an electrical connection box according to the third aspect of the invention, wherein a lock receiving section is provided on an inner side surface of said protection apparatus attachment recess and a locking section for locking into said lock receiving section is provided on an outer side surface of said fixed member.

The "operation" of the invention is described below.

In the first aspect of the invention, a protection apparatus is installed in an electrical connection box. Accordingly, even when no space is available for installing a protection apparatus inside an engine compartment, the protection apparatus can be installed easily. The protection apparatus is attached to a protection apparatus attachment section. This avoids the necessity of an attachment structure which is otherwise to be fabricated separately from the electrical connection box so as to fix the protection apparatus. Thus, costs necessary for installing the protection apparatus are reduced. Further, the protection apparatus is accommodated in the electrical connection box. This improves the water proofing properties of the protection apparatus.

In the second aspect of the invention, a bus bar is engaged with an electrically conductive member provided in the electrical connection box, whereby the protection apparatus is attached to the electrical connection box. Thus, in comparison with the case where the bus bar is bolted in order to attach the protection apparatus to the electrical connection box, the attachment work of the protection apparatus is carried out efficiently. Further, no structure for bolting is necessary in the protection apparatus attachment section and the bus bar. This reduces the number of components necessary for attaching the protection apparatus to the electrical connection box. Thus, in turn, costs necessary for attaching the protection apparatus to the electrical connection box are reduced.

In the third aspect of the invention, a protection apparatus is installed in the state accommodated in a protection apparatus attachment recess, whereby only a small portion of the protection apparatus protrudes from the box main body. This permits downsizing of the electrical connection box. At that time, the protection apparatus is supported not only on the bottom surface but also in the side surfaces by the protection apparatus attachment recess. This improves the attachment strength of the protection apparatus. Further, external force seldom acts directly on the protection apparatus. This prevents the protection apparatus from being detached by an external force. Thus, the electric connection between the protection apparatus and the electrical connection box is securely maintained, whereby electrical power is stably supplied from an in-vehicle power supply to an electrical load. Further, only a small portion of the protection apparatus is exposed. This improves the water proofing properties of the protection apparatus.

In the fourth aspect of the invention, a protection apparatus is fixed to the electrical connection box not only by engaging a bus bar with the electrical connection box, but also by locking a locking section into a lock receiving section. This means that a greater number of attachment sections are used between the protection apparatus and the electrical connection box. Thus, the protection apparatus is fixed to the electrical connection box more securely. The locking section contacts with the lock receiving section. This prevents the protection apparatus from shifting even when an external force, such as vibrations, acts on the protection apparatus. This prevents the protection apparatus from being detached. Thus, electrical power is stably supplied from an in-vehicle power supply to an electrical load.

DETAILED DESCRIPTION OF THE PREFERRED EMBODIMENTS

An embodiment of an electrical connection box for automobiles having a protection apparatus attachment structure according to the invention is described below in detail with reference to FIG. 1 through FIG. 19.

Figure 1:
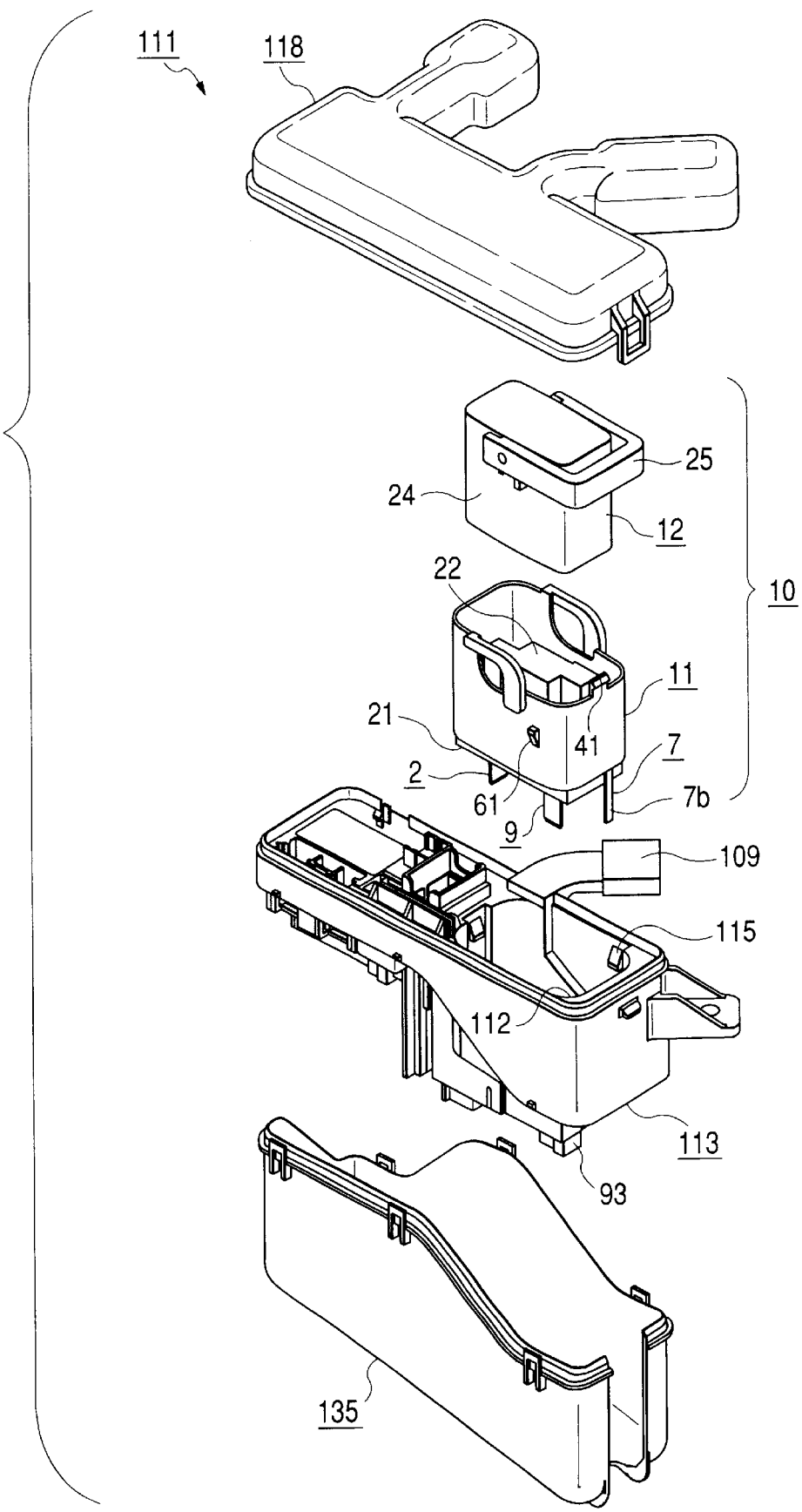
FIG. 1 is an exploded perspective view showing an electrical connection box according to the present embodiment.
Figure 2:
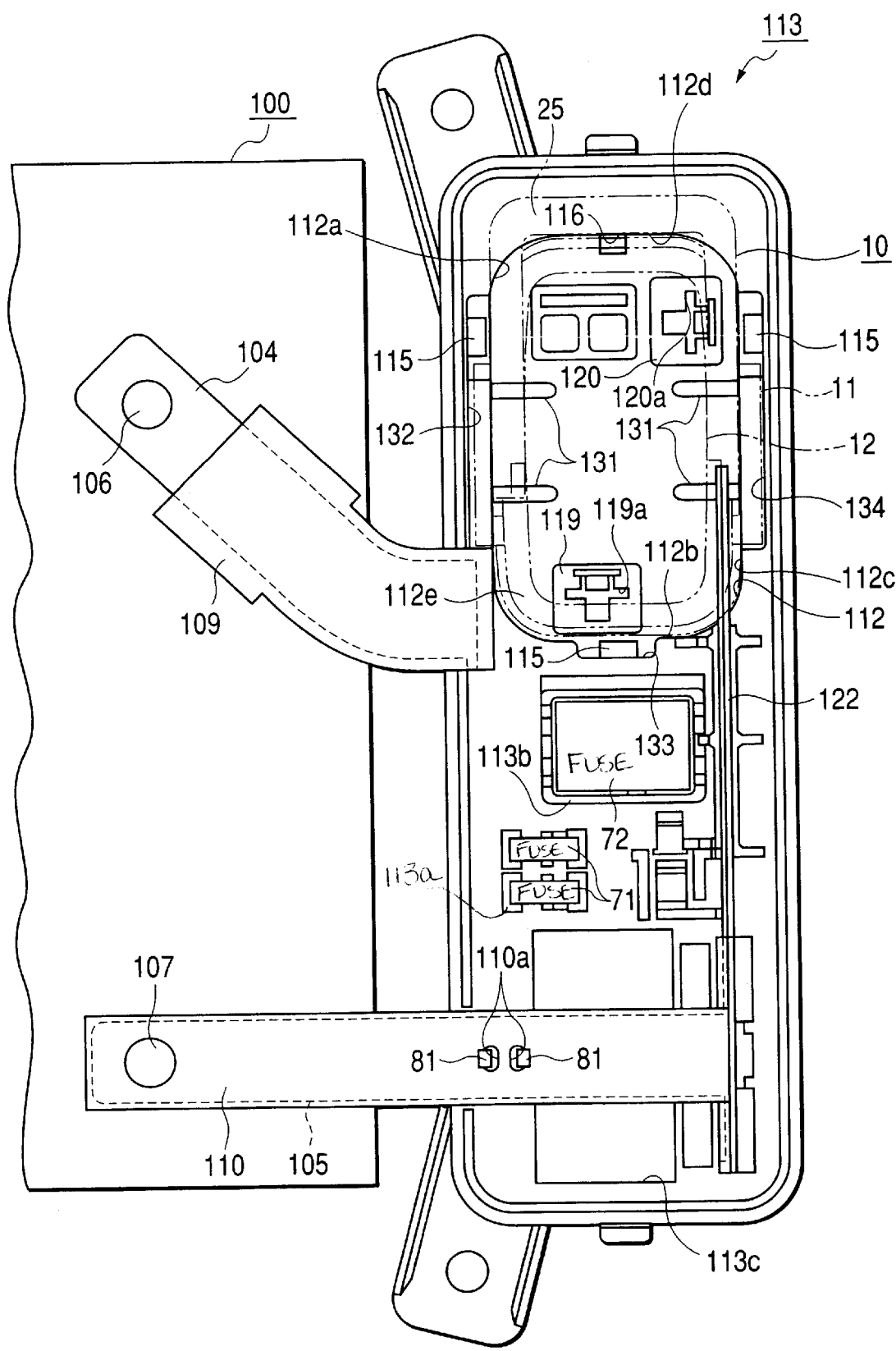
FIG. 2 is a top view of a box main body.

As shown in FIG. 1, an electrical connection box 111 is composed of a box main body 113 provided with an upper cover 118 and a lower cover 135. The electrical connection box 111, shown in FIG. 1, is directly connected, as shown in FIG. 2, via battery connection plates 104 and 105 to a battery 100 serving as an in-vehicle power supply. More specifically, as shown in FIG. 2, the tip of the battery connection plate 104 is connected to the positive terminal 106 of the battery 100. The battery connection plate 104 is covered by a protection section 109. The tip of the battery connection plate 105 is connected to the negative terminal 107 of the battery 100. The battery connection plate 105 is covered by a protection section 110. These protection sections 109, 110, positive terminal 106, and negative terminal 107 are covered by the upper cover 118.

As shown in FIG. 2, the top surface of the box main body 113 is provided with a pair of engagement protrusions 81. The engagement protrusions 81 engage with engagement holes 110a provided in the protection section 110, and thereby fix the protection section 110 and the battery connection plate 105 to the box main body 113.

The top surface of the box main body 113 is provided with fuse attachment sections 113a and 113b and a current sensor attachment section 113c which serve as electric component attachment sections. The fuse attachment sections 113a and 113b accommodate fuses 71 and 72 serving as electric components. The current sensor attachment section 113c accommodates a current sensor (not shown) serving as an electric component.

Figure 4:
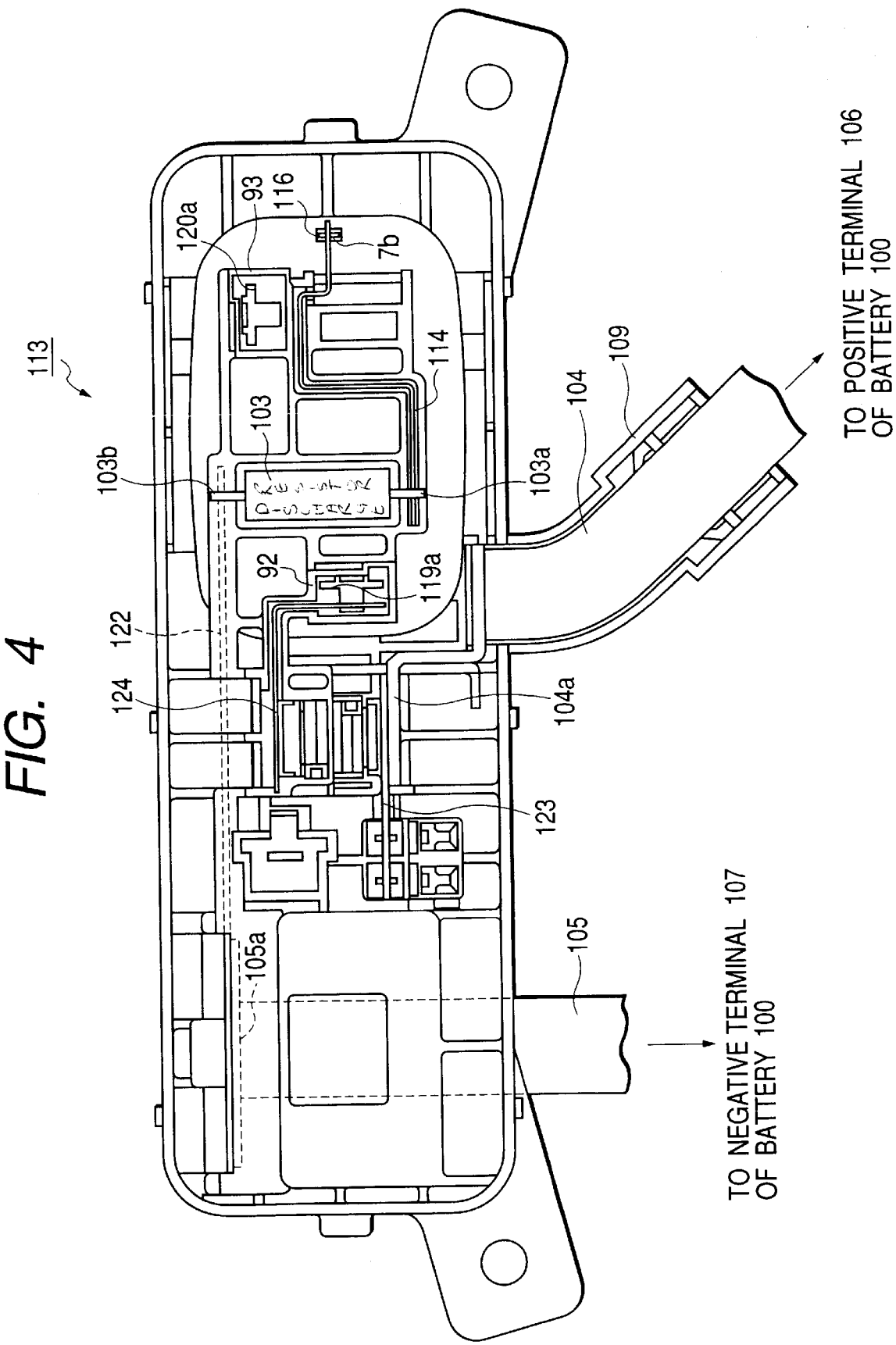
FIG. 4 is a bottom view of a box main body.

As shown in FIG. 4, the bottom surface of the box main body 113 is provided with an attachment section 92. The bottom surface of the box main body 113 is further provided with a connector attachment section 93. The connector attachment section 93 accommodates a connector (not shown). This connector is used for electrically connecting an electrical load 101 described later. The bottom surface of the box main body 113 is further provided with a discharge resistor 103.

As shown in FIG. 4, the box main body 113 is provided with an electrically conductive plate 123 on the bottom surface side of the box main body 113. The electrically conductive plate 123 is composed of a metal plate having electric conductivity. The electrically conductive plate 123 contacts with a pedestal 104a of the battery connection plate 104. Further, the electrically conductive plate 123 electrically connects to a terminal of the fuse 71. The electrically conductive plate 123 electrically connects also to a terminal of the fuse 72.

As shown in FIG. 4, the box main body 113 is provided with an electrically conductive plate 124 on the bottom surface side of the box main body 113. The electrically conductive plate 124 is composed of a substantially L-shaped metal plate having electric conductivity. An end of the electrically conductive plate 124 electrically connects to a terminal of the fuse 72. The other end of the electrically conductive plate 124 is accommodated inside the attachment section 92.

Figure 3:
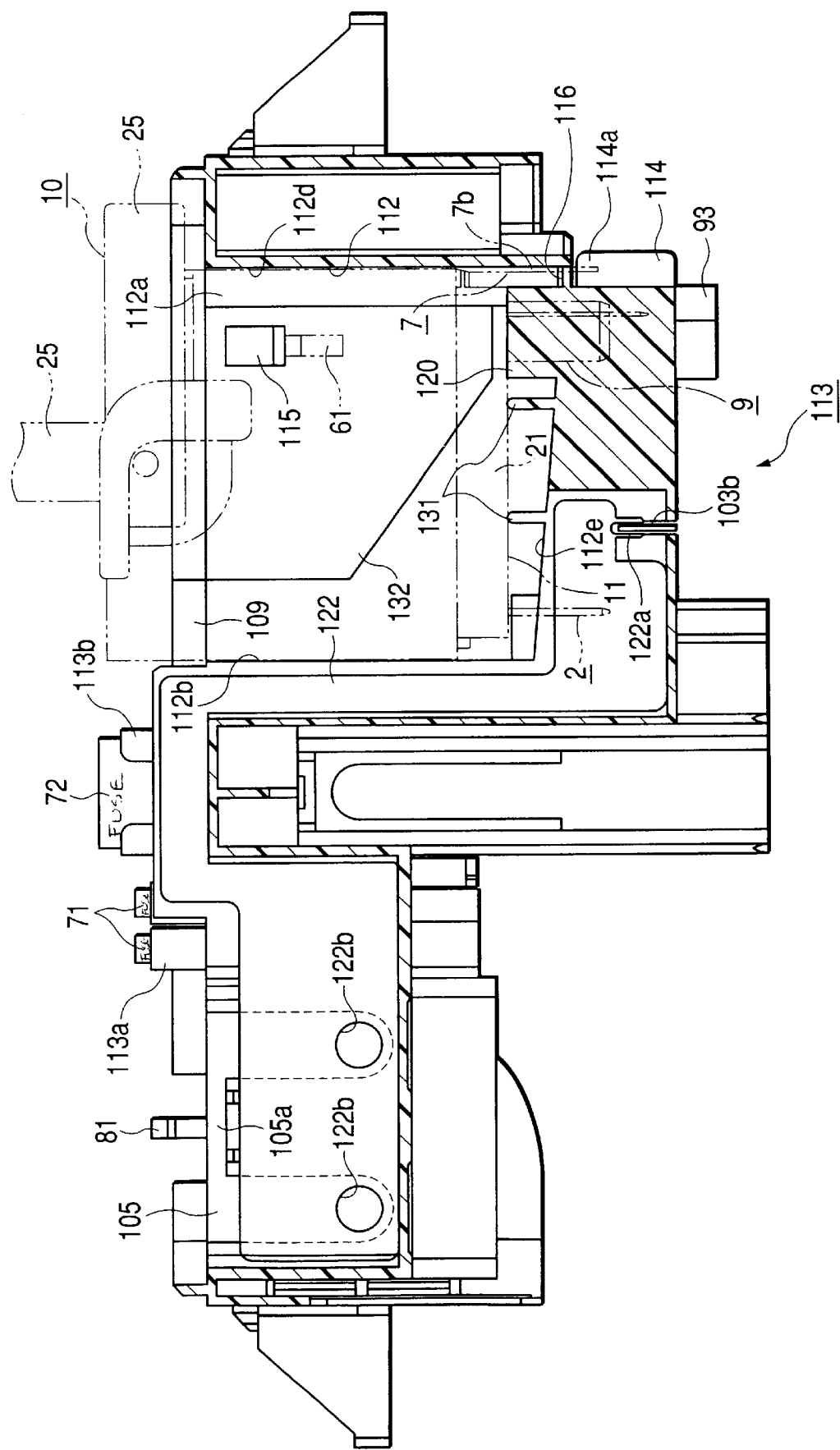
FIG. 3 is an elevation cross sectional view of a box main body.

As shown in FIG. 3, the box main body 113 is provided with an electrically conductive plate 122 on the top surface side of the box main body 113. The electrically conductive plate 122 is composed of a metal plate having electric conductivity. An end of the electrically conductive plate 122 is provided with a pressing section 122a having a substantially U-shaped cut. As shown also in FIG. 4, the pressing section 122a electrically connects to an end 103b of a discharge resistor 103. The other end of the electrically conductive plate 122 is provided with two bolt passing holes 122b. A bolt (not shown) is inserted through each bolt passing hole 122b, whereby the electrically conductive plate 122 is connected to a pedestal 105a of the above-mentioned battery connection plate 105. As a result, the discharge resistor 103 is electrically connected to the above-mentioned battery 100.

As shown in FIG. 3 and FIG. 4, the box main body 113 is provided with an electrically conductive plate 114 serving as an electrically conductive component, on the bottom surface side of the box main body 113. The electrically conductive plate 114 is composed of a bent metal plate having electric conductivity. An end of the electrically conductive plate 114 is provided with a pressing section 114a having a substantially U-shaped cut. The other end of the electrically conductive plate 114 electrically connects to an end 103a of the discharge resistor 103. As a result, the electrically conductive plate 114 is electrically connected to the battery 100.

As shown in FIG. 1 through FIG. 3, the top surface of the box main body 113 is provided with a protection apparatus attachment recess 112 serving as a protection apparatus attachment section. The protection apparatus attachment recess 112 has an opening on the surface provided with fuse attachment sections 113a and 113b and the current sensor attachment section 113c in the box main body 113. The opening of the protection apparatus attachment recess 112 has a substantially rectangular shape. The surface provided with the protection apparatus attachment recess 112 in the box main body 113 is covered by the above-mentioned upper cover 118. The protection apparatus attachment recess 112 accommodates a power supply breaker apparatus 10 serving as a protection apparatus.

As shown in FIG. 2 and FIG. 3, each inner side surface 112a, 112b and 112c of the protection apparatus attachment recess 112 is provided with a recess 132, 133 and 134, respectively. Each recess 132, 133 and 134 is arranged in the center portion of each inner side surface 112a, 112b and 112c. Each recess 132, 133 and 134 is provided with a lock receiving protrusion 115 serving as a lock receiving section. The protrusion height of each lock receiving protrusion 115 is set not to protrude from each inner side surface 112a, 112b and 112c. The lock receiving protrusion 115 provided in the recess 133 is arranged in the center portion of the recess 133. The lock receiving protrusion 115 provided in each recess 132, 134 is arranged on the inner side surface 112d side of said protection apparatus attachment recess 112, in each recess 132, 134. The lock receiving protrusion 115 provided in each recess 132, 134 is arranged such as to oppose to each other inside the protection apparatus attachment recess 112. Each lock receiving protrusion 115 is arranged in a manner separated from each other at three positions in each inner side surface 112a, 112b, 112c of the protection apparatus attachment recess 112. Each lock receiving protrusion 115 is at the same elevation in each inner side surface 112a, 112b, 112c of the protection apparatus attachment recess 112. Each lock receiving protrusion 115 is arranged in the vicinity of the opening of the protection apparatus attachment recess 112.

As shown in FIG. 2 and FIG. 3, the bottom surface 112e of the protection apparatus attachment recess 112 is provided with positioning ribs 131 in a protruded manner separated from each other at four positions. Each two of the positioning ribs 131 are connected to each inner side surface 112a, 112c, respectively. The positioning ribs 131 connected to the inner side surface 112a and the positioning ribs 131 connected to the inner side surface 112c are arranged such as to oppose to each other on the bottom surface 112e. Each positioning rib 131 is set at the same elevation. The bottom surface 112e of the protection apparatus attachment recess 112 is provided with an input terminal passing section 119 in a protruded manner. The input terminal passing section 119 has substantially the same height as that of each positioning rib 131. The input terminal passing section 119 is provided with an input terminal passing hole 119a having a substantially rectangular shape. The bottom surface 112e of the protection apparatus attachment recess 112 is provided with an output terminal passing section 120 in a protruded manner. The output terminal passing section 120 has substantially the same height as that of each positioning rib 131 and the input terminal passing section 119. The output terminal passing section 120 is provided with an output terminal passing hole 120a having a substantially rectangular shape. The bottom surface 112e of the protection apparatus attachment recess 112 is provided with a bus bar passing hole 116 having a substantially rectangular shape. The bus bar passing hole 116 is arranged such that a part of the opening periphery of the bus bar passing hole 116 contacts with the inner side surface 112d. The bus bar passing hole 116 passes through to the outside of the box main body 113.

Described below is the circuit configuration of the power supply breaker apparatus 10.

Figure 5:
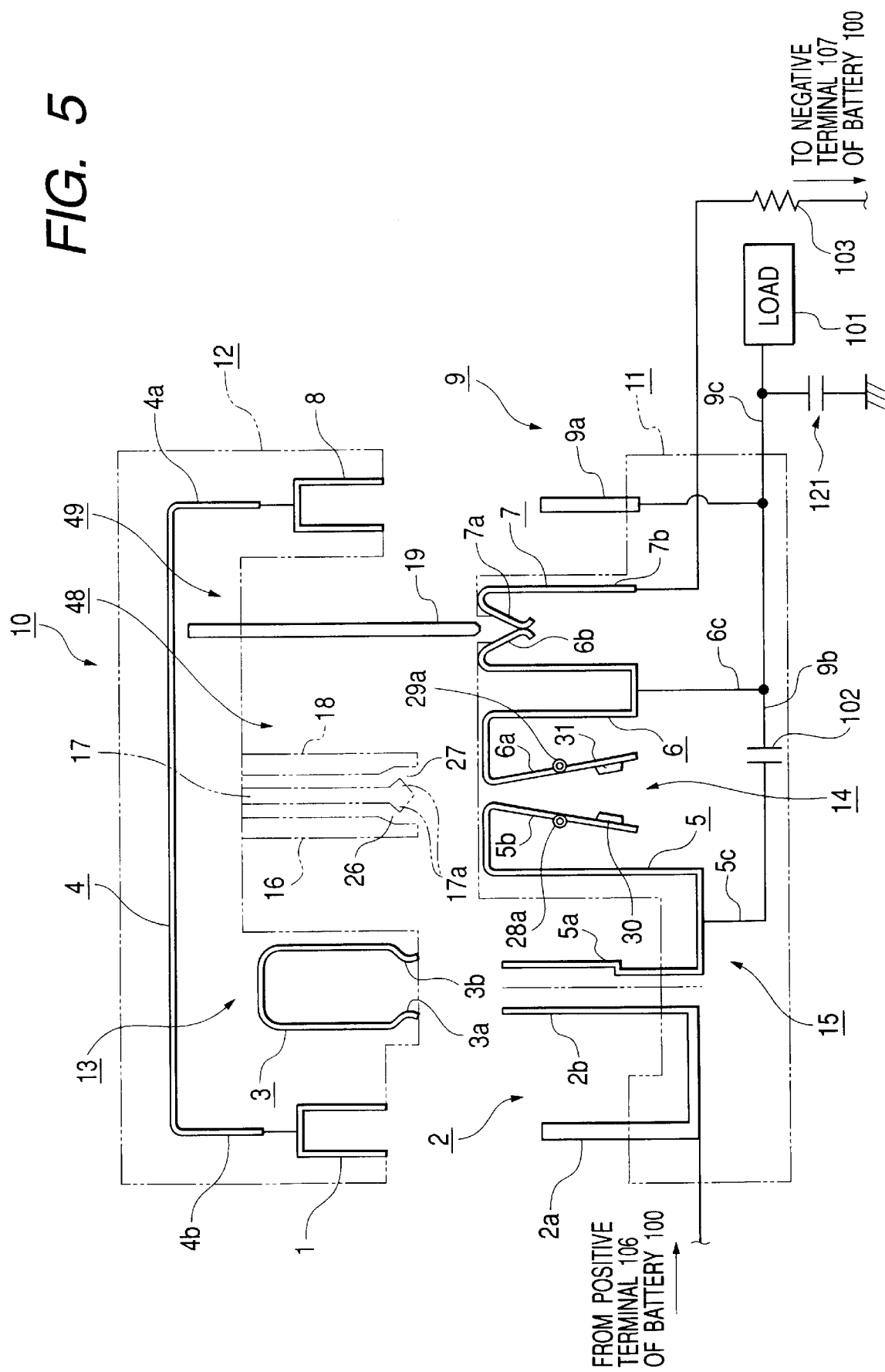
FIG. 5 is a circuit diagram showing the detached state of a power supply breaker apparatus.
Figure 6:
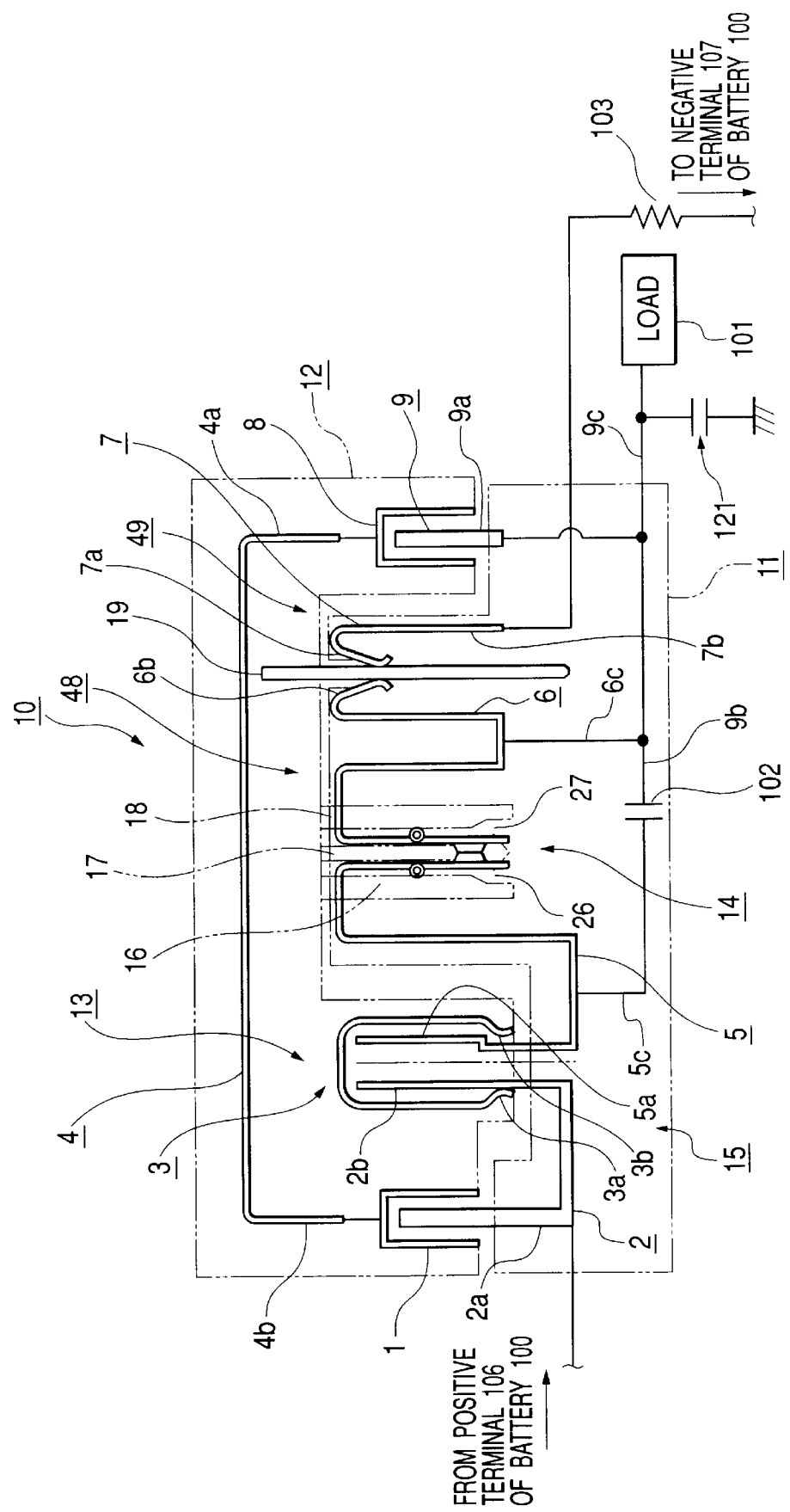
FIG. 6 is a circuit diagram showing the attached state of a power supply breaker apparatus.

As shown in FIG. 5 and FIG. 6, the power supply breaker apparatus 10 is arranged between the above-mentioned battery 100 and an electrical load 101 such as a radio receiver and a navigation apparatus, and thereby breaks the supply of electrical power from the battery 100 to the electrical load 101 when necessary. In the present embodiment, the battery 100 has the discharge voltage of 36 V. The electrical load 101 may be composed of a single electrical load or a plurality of electrical loads in a vehicle.

A fixed member 11 constituting a part of the power supply breaker apparatus 10 comprises an input terminal 2, an output terminal 9, and terminal members 5, 6. The input terminal 2 connects to the battery 100. The output terminal 9 and the terminal member 6 connect directly to the electrical load 101. The terminal member 5 connects through a capacitor 102 to the electrical load 101. The terminal members 5, 6 serve as a part of a second current path 15 for interconnecting the input terminal 2 and the output terminal 9.

A movable member 12 constituting a part of the power supply breaker apparatus 10 comprises movable-member side connection terminals 1, 8 constituting a part of a first current path. When the movable member 12 is attached to the fixed member 11 ("attached state," hereafter), the movable-member side connection terminal 1 connects to a terminal section 2a of the input terminal 2. In the attached state, the movable-member side connection terminal 8 connects to a terminal section 9a of the output terminal 9. The movable member 12 further comprises an electrically conductive member 4 and a connection conductor 3 constituting a part of the first current path. The electrically conductive member 4 interconnects the movable-member side connection terminals 1, 8.

Accordingly, as shown in FIG. 5, when the movable member 12 is detached from the fixed member 11 ("detached state," hereafter), the movable-member side connection terminal 1 is separated from the input terminal 2, while the movable-member side connection terminal 8 is separated from the output terminal 9. In the attached state as shown in FIG. 6, the voltage from the battery 100 is supplied through the input terminal 2, the movable-member side connection terminals 1, 8, the electrically conductive member 4, and the output terminal 9, to the electrical load 101.

A power switching terminal section 2b of the input terminal 2 is arranged such as to oppose to a power switching terminal section 5a of the terminal member 5. When the movable member 12 is gradually attached to the fixed member 11, at an early stage of this, the power switching terminal section 2b connects to a terminal section 3a of the connection conductor 3, while the power switching terminal section 5a connects to a terminal section 3b of the connection conductor 3. When the movable member 12 has been fully attached to the fixed member 11, the terminal section 3b separates from the power switching terminal section 5a. In contrast, the terminal section 3a continues to connect to the power switching terminal section 2b. In the detached state, the power switching terminal sections 2b, 5a are disconnected from the terminal sections 3b, 3a of the connection conductor 3. That is, the power switching terminal sections 2b, 5a and the connection conductor 3 serve as power switching means 13 for switching the second current path 15 between a make state and a break state.

The terminal members 5, 6 are composed of an elastically deformable material such as phosphor bronze. Spring pieces 5b, 6a are set such as to separate from each other in a natural state. The spring pieces 5b, 6a contact with each other in the attached state, but separate from each other in the detached state. That is, the spring pieces 5b, 6a serve as first contact means 14. The first contact means 14 is opened or closed by guide grooves 26, 27 formed between three droop pieces 16, 17, 18. The guide grooves 26, 27 are in parallel to each other. The droop pieces 16–18 are provided inside the movable member 12. The bottom end of the center droop piece 17 is provided with ridges 17a protruding into both sides. The droop pieces 16–18 serve as an operation section 48. In the attached state of the movable member 12, the droop pieces 16–18 enforce the spring pieces 5b, 6a to close, and thereby cause terminal protection contacts 30, 31 to abut against each other.

More specifically, when the movable member 12 is attached, a reverse section 28a is guided into the guide groove 26, while a reverse section 29a is guided into the guide groove 27. After the ridges 17a pass through between the reverse sections 28a, 29a, the reverse sections 28a, 29a are guided into a parallel portion of the guide grooves 26, 27. As a result, the spring pieces 5b, 6a having been separated from each other go close to each other, whereby the terminal protection contacts 30, 31 abut against each other. In contrast, when the movable member 12 is detached, the operation is reversed. As a result, the spring pieces 5b, 6a return to the state separated from each other, whereby the terminal protection contacts 30, 31 do not abut against each other.

The terminal protection contacts 30, 31 are composed of a material having higher arc resistance than an ordinary electrically conductive material (such as copper) used in the input terminal 2 and the output terminal 9. For example, the terminal protection contacts 30, 31 are composed of a Ag—CdO material, a Ag—Ni material, a Ag-metal oxide material, or a Ag—Cr material.

A terminal section 6c of the terminal member 6 connects to the electrical load 101 and a capacitor 121. The capacitor 121 is grounded. The battery 100 and the electrical load 101 are interconnected via the power switching means 13 and the first contact means 14 provided in the second current path 15.

The terminal section 6b can be switched into a connected state or a non-connected state with respect to the terminal section 7a. These terminal sections 6b, 7a constitute second contact means 49. The second contact means 49 is set such that the terminal sections 6b, 7a connect to each other in a natural state. Further, the terminal sections 6b, 7a are set such as to go into a non-connected state by virtue of a droop piece 19 in the attached state. A tab 7b of the bus bar 7 connects to the discharge resistor 103. The discharge resistor 103 electrically connects to the above-mentioned negative terminal 107 of the battery 100.

Described below is the mechanical configuration of the power supply breaker apparatus 10.

Figure 7:
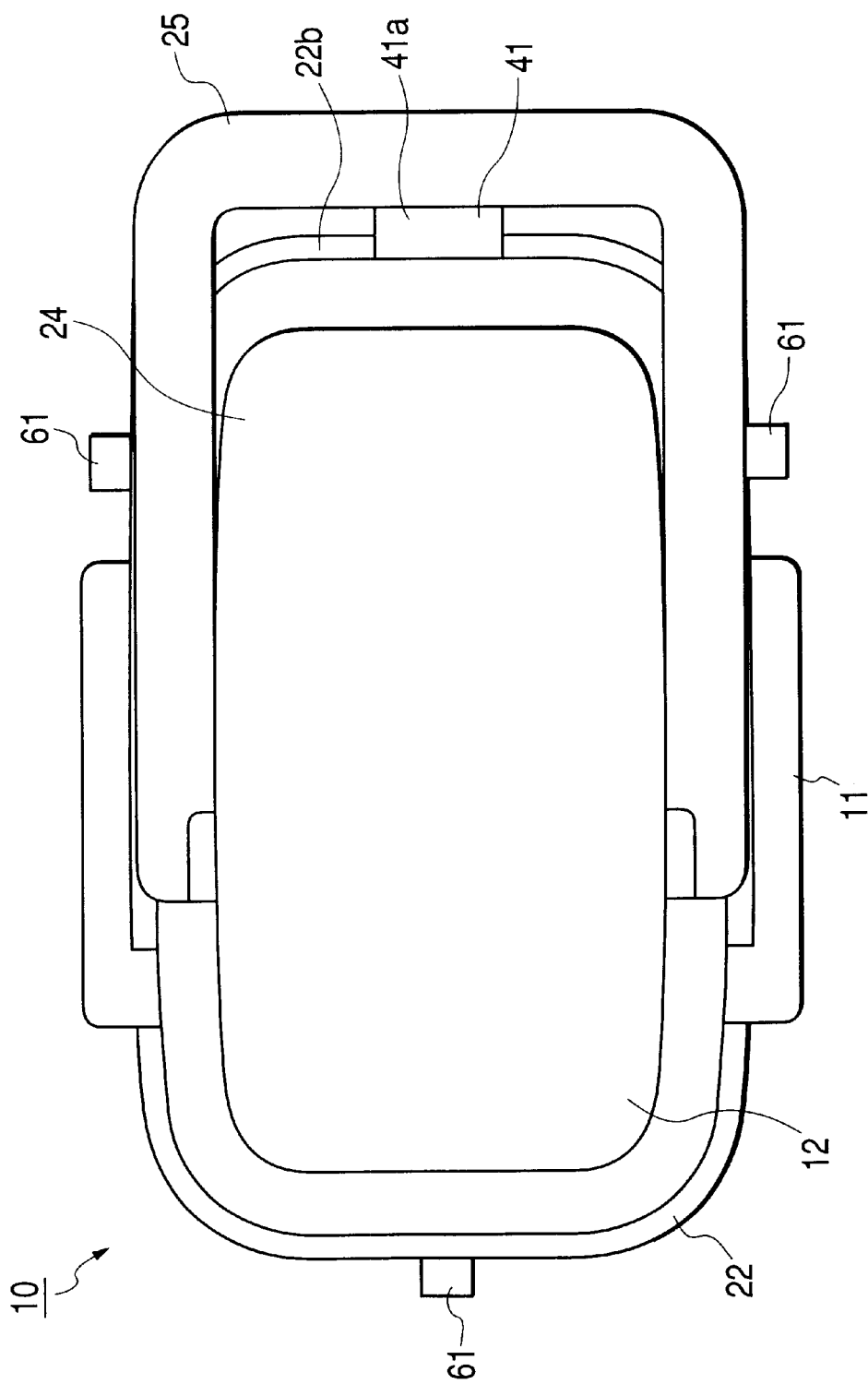
FIG. 7 is a top view of a power supply breaker apparatus.

As shown in FIG. 1 and FIG. 7, the power supply breaker apparatus 10 comprises the fixed member 11 and the movable member 12. The fixed member 11 is accommodated inside the above-mentioned protection apparatus attachment recess 112.

Figure 8:
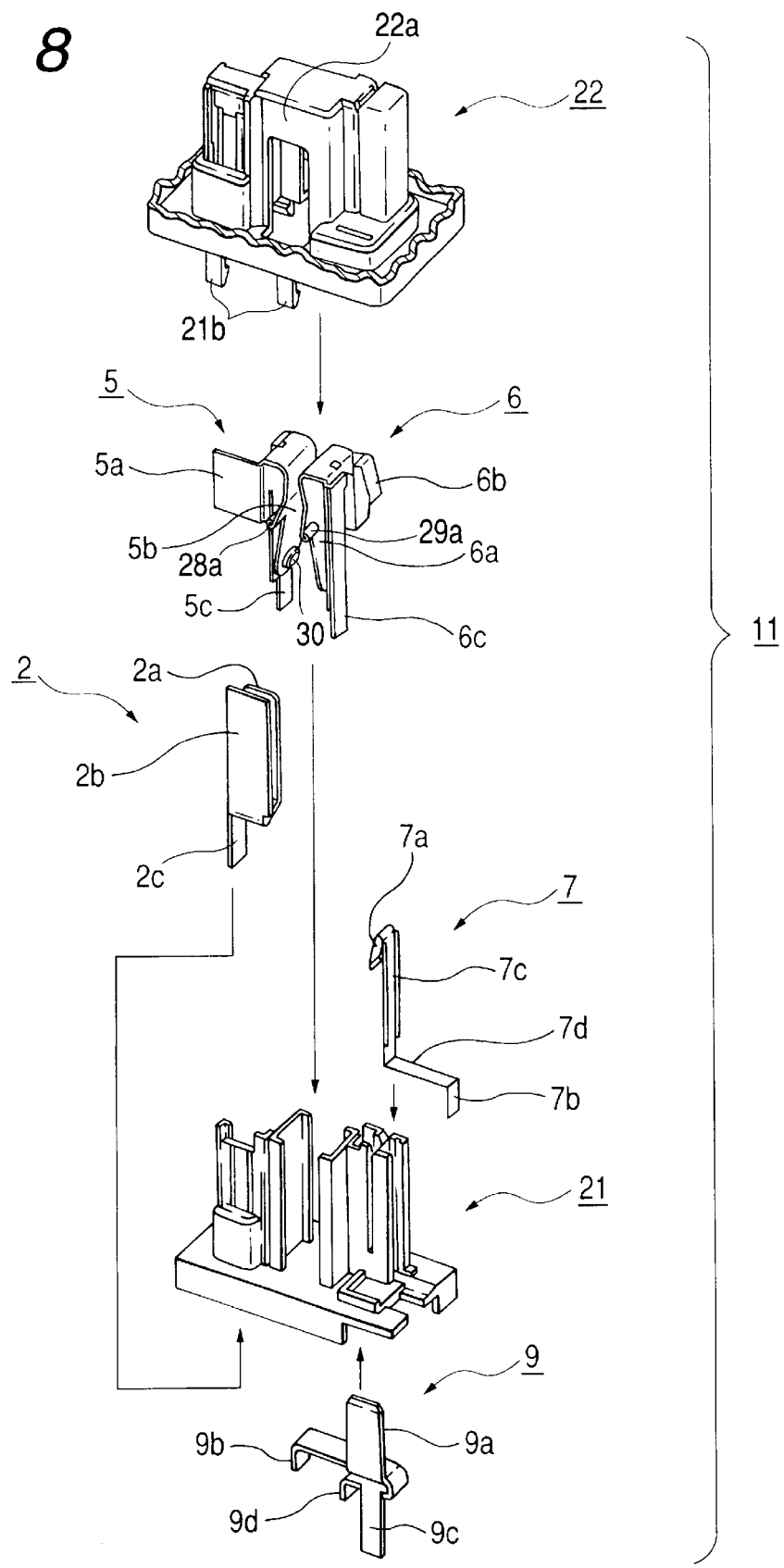
FIG. 8 is an exploded perspective view showing a fixed member.

As shown in FIG. 8, the fixed member 11 is configured such that a housing cover 22 covers a part of a housing 21. The housing 21 and the housing cover 22 are composed of an insulating material such as synthetic resin. The bottom end of the housing cover 22 is provided with locking claws 21a for locking the housing cover 22 to the housing 21. The locking claws 21a are arranged in a manner separated from each other at a plurality of positions (four positions in the present embodiment) in the bottom end of the housing cover 22.

Figure 9:
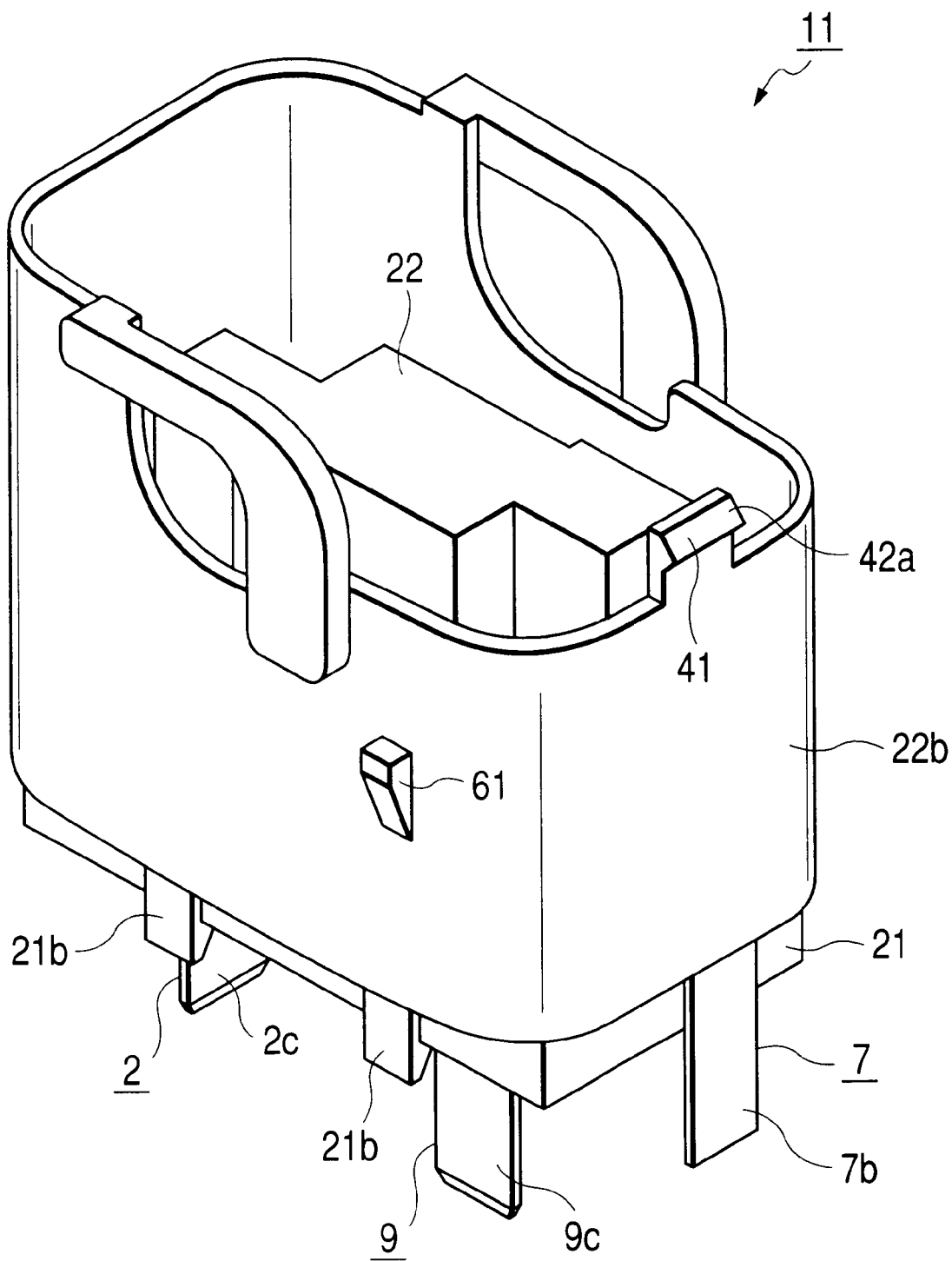
FIG. 9 is a general perspective view showing a fixed member.

As shown in FIG. 7 and FIG. 9, the top end of the housing 21 is provided with a locking section 41. The locking section 41 is arranged in a wall 22b of the housing 21. The locking section 41 is provided with a claw 41a in a manner protruding outside the housing 21. When the fixed member 11 is attached to the protection apparatus attachment recess 112, the locking section 41 is exposed from the top surface of the box main body 113. An outer side surface of the housing 21 is provided with locking protrusions 61 serving as a locking section. The locking protrusions 61 are arranged in a manner separated from each other at a plurality of positions (three positions in the present embodiment) in the outer side surfaces of the housing 21. When the fixed member 11 is attached to the protection apparatus attachment recess 112, each locking protrusion 61 locks with each of the above-mentioned lock receiving protrusions 115. The power supply breaker apparatus 10 is prevented from being inserted in an inappropriate orientation into the protection apparatus attachment recess 112, by virtue that the locking protrusions 61 hit the pedestal of the above-mentioned protection section 109 and the opening of the protection apparatus attachment recess 112.

Figure 12:
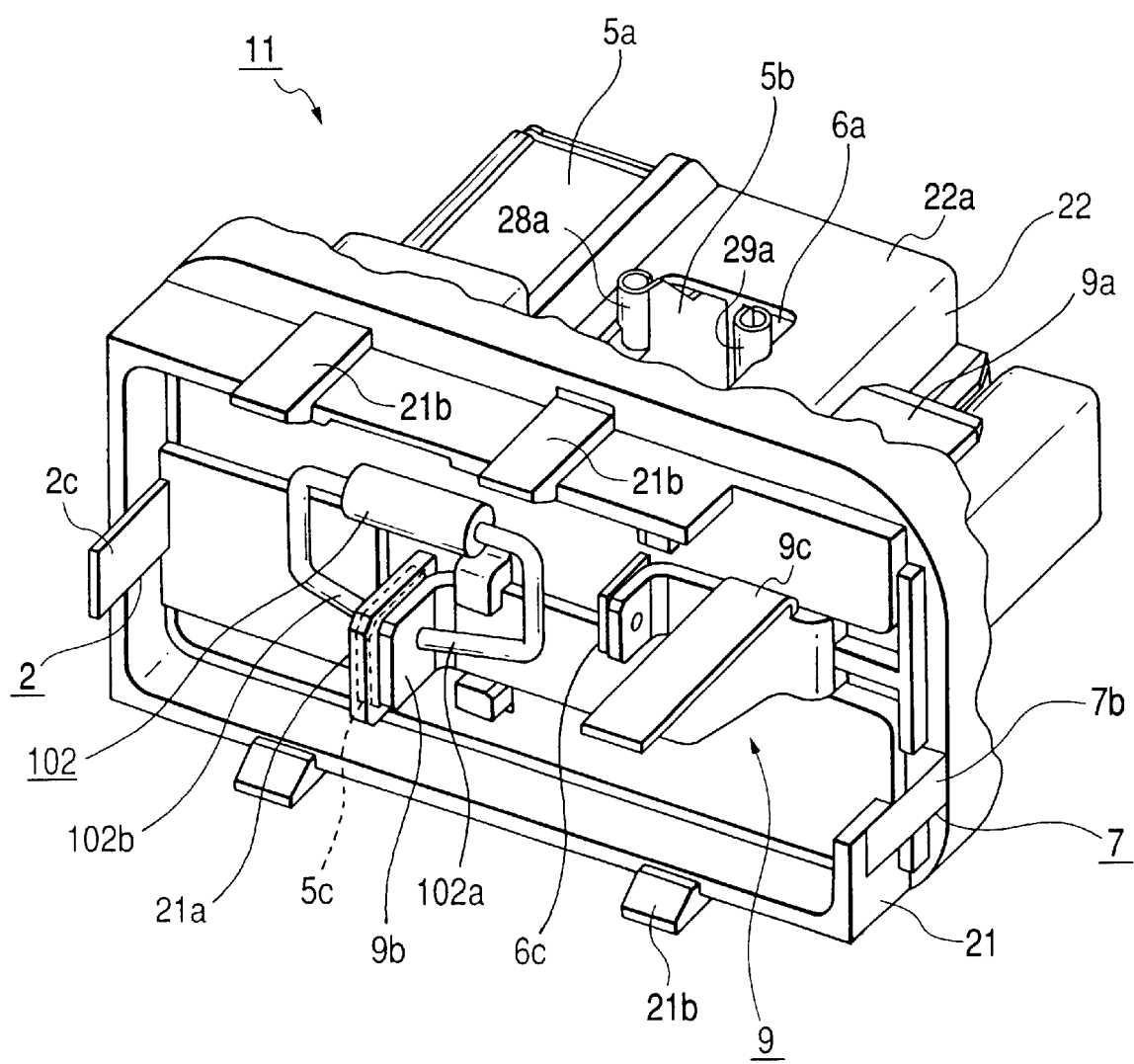
FIG. 12 is a bottom view of a fixed member.

As shown in FIG. 8 and FIG. 12, the housing 21 is provided with an output terminal 9 on the bottom side. The output terminal 9 comprises terminal sections 9a, 9b, 9c, 9d. In FIG. 8 and FIG. 12, the terminal section 9a extends upward, and thereby is exposed outside the housing cover 22. In FIG. 8, the terminal section 9b extends to the left, while the terminal sections 9c, 9d extend downward. As shown in FIG. 12, the terminal section 9b is arranged on the right of a tab piece 21a provided downside the housing 21. The terminal section 9b connects to an end 102a of a capacitor 102. The terminal section 9c is arranged on the left of the tab piece 21a. The terminal section 9c passes through the above-mentioned output terminal passing hole 120a, and then protrudes into the above-mentioned connector attachment section 93. In this configuration, when the above-mentioned connector is attached, the terminal section 9c connects to the above-mentioned electrical load 101.

Figure 10:
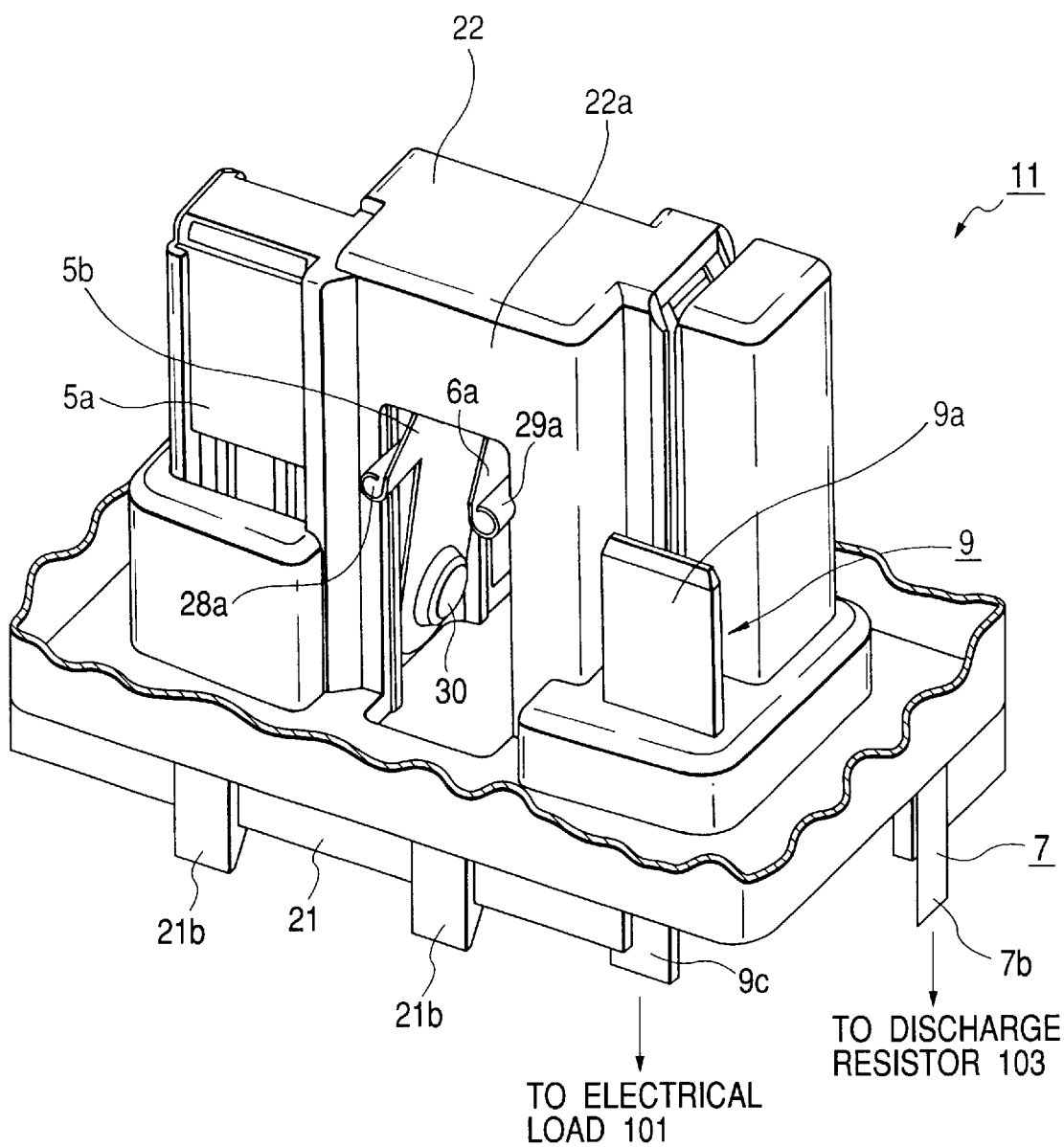
FIG. 10 is a main perspective view showing a fixed member.
Figure 11:
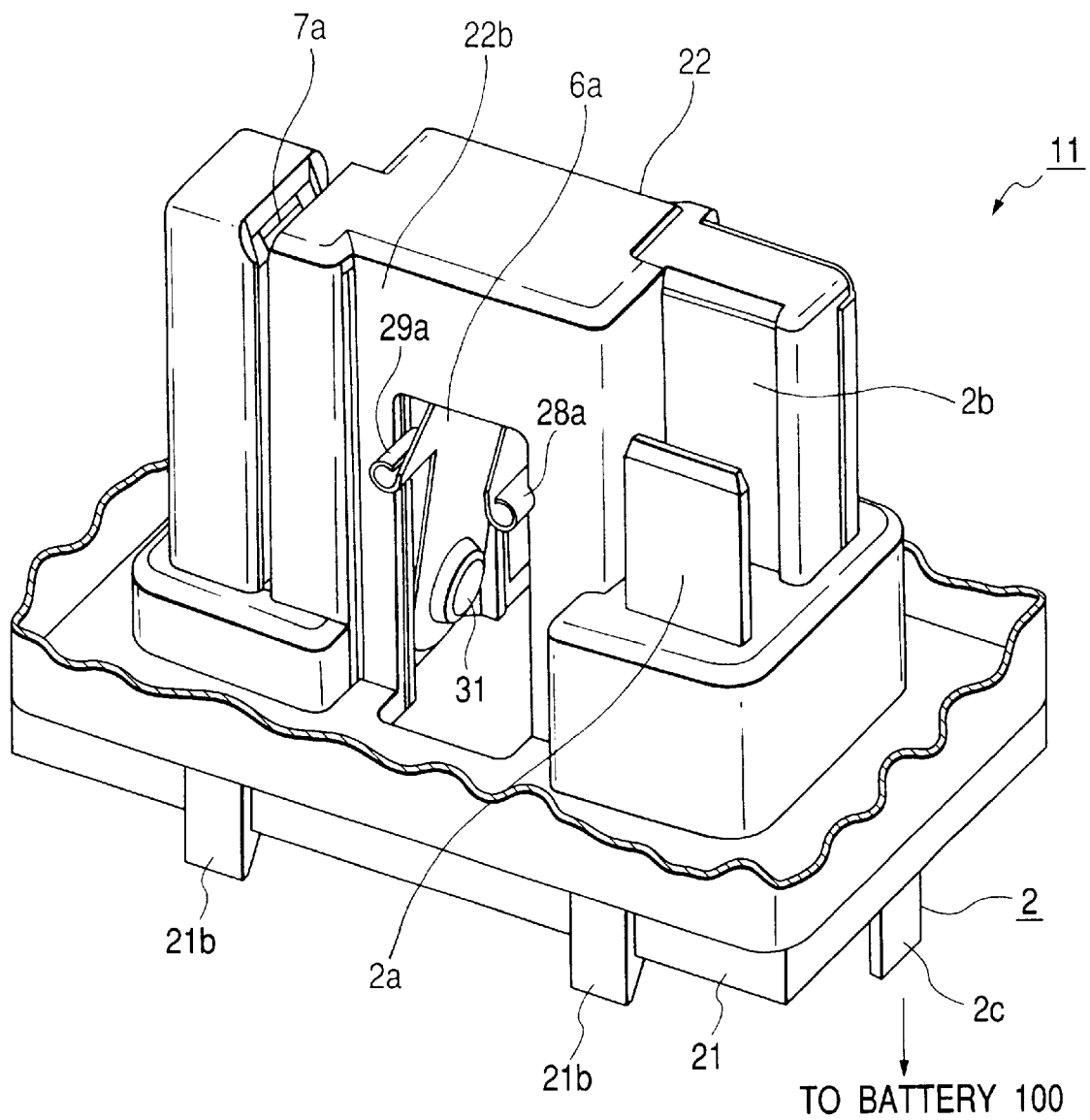
FIG. 11 is a main perspective view showing a fixed member.
Figure 14:
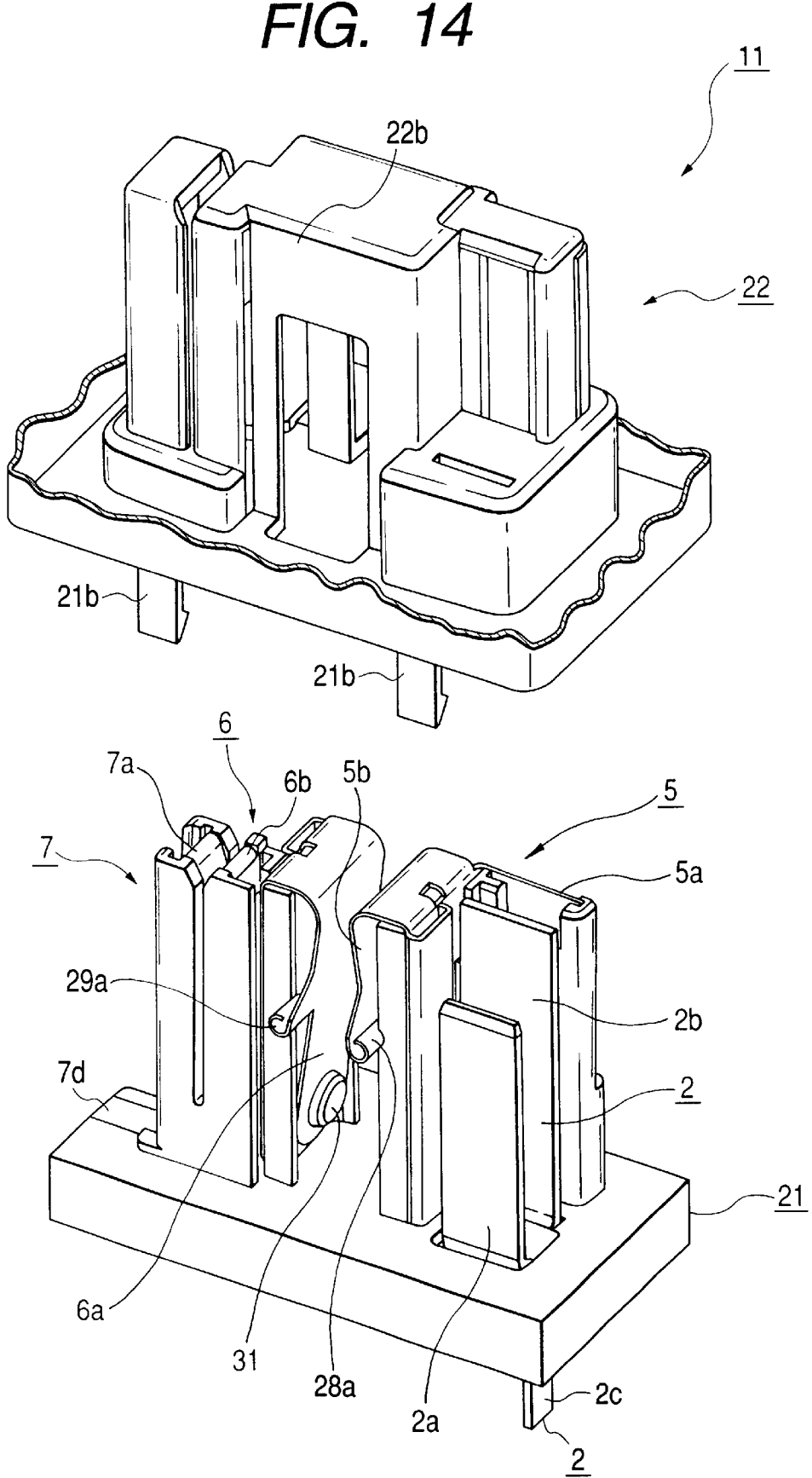
FIG. 14 is an exploded perspective view showing a fixed member.

As shown in FIG. 8, the housing 21 is provided with a terminal member 6 on the top side. The terminal member 6 comprises terminal sections 6b, 6c and a spring piece 6a. As shown in FIG. 12, the terminal section 6c passes through the housing 21 in the vertical directions. The terminal section 6c contacts with the terminal section 9d downside the housing 21. As shown in FIG. 11 and FIG. 14, the bottom end of the spring piece 6a is provided with a terminal protection contact 31. A reverse section 29a is provided in the center in the longitudinal directions of the spring piece 6a. As shown in FIG. 10 and FIG. 11, when the housing cover 22 is attached to the housing 21, both ends of the reverse section 29a protrude from side surfaces 22a, 22b of the housing cover 22.

Figure 13:
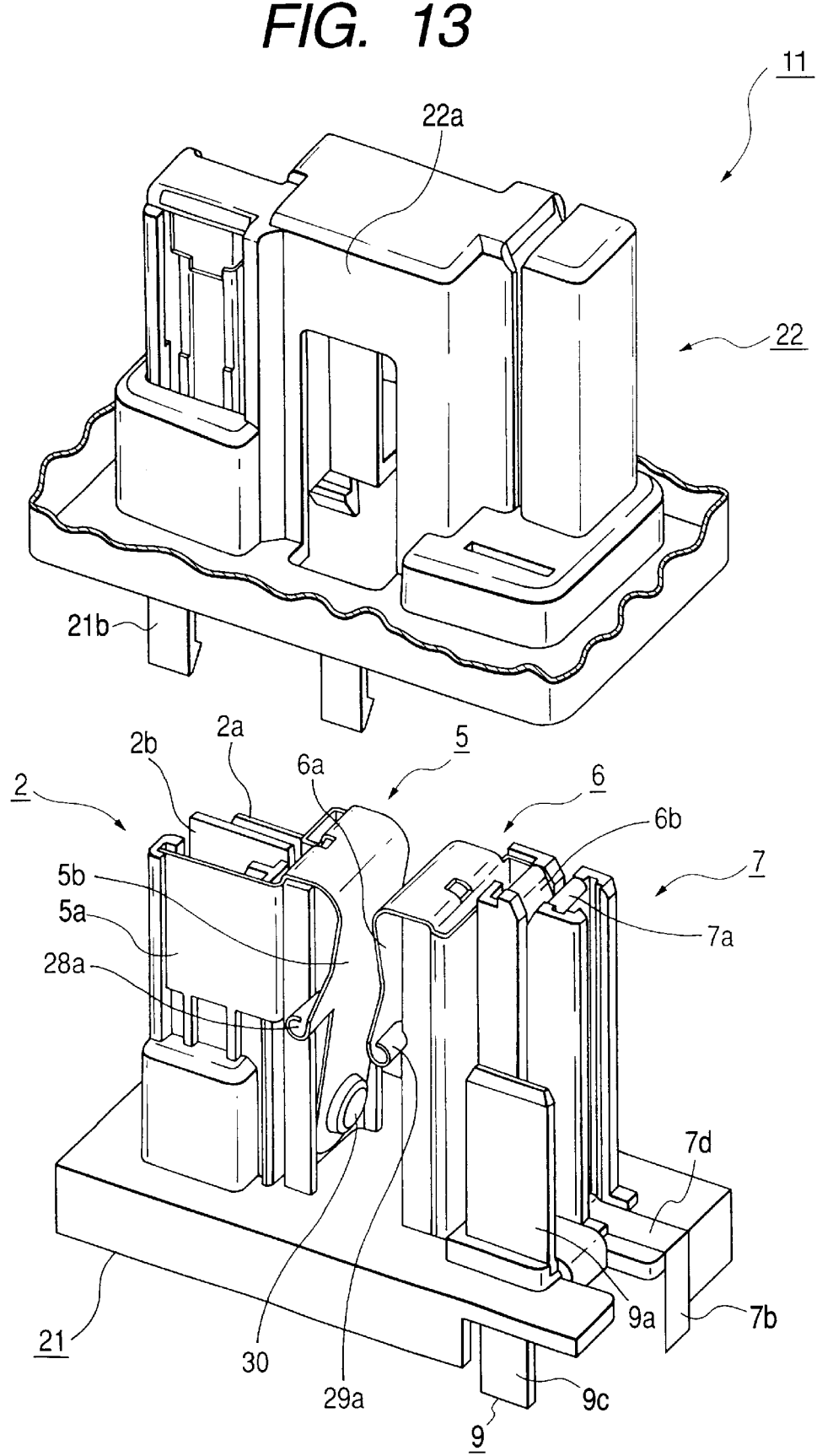
FIG. 13 is an exploded perspective view showing a fixed member.

As shown in FIG. 8, the housing 21 is provided with a terminal member 5 on the top side. The terminal member 5 comprises a power switching terminal section 5a, a terminal section 5c and a spring piece 5b. As shown in FIG. 8 and FIG. 10, the power switching terminal section 5a is formed by being bent at right angles from the terminal section 5c, and thereby exposed outside the housing cover 22. As shown in FIG. 12, the terminal section 5c passes through the housing 21 in the vertical directions. The terminal section 5c is arranged on the left of the tab piece 21a provided downside the housing 21. The terminal section 5c is insulated from the terminal section 9b by the tab piece 21a. The terminal section 5c connects to the other end 102b of the capacitor 102. As shown in FIG. 10 and FIG. 13, the spring piece 5b opposes to the spring piece 6a. The bottom end of the spring piece 5b is provided with a terminal protection contact 30 abutting against the terminal protection contact 31. A reverse section 28a is provided in the center in the longitudinal directions of the spring piece 5b. As shown in FIG. 10 and FIG. 11, when the housing cover 22 is attached to the housing 21, both ends of the reverse section 28a protrude from side surfaces 22a, 22b of the housing cover 22.

As shown in FIG. 8, the housing 21 is provided with an input terminal 2 on the bottom side. The input terminal 2 comprises a power switching terminal section 2b and terminal sections 2a, 2c. As shown also in FIG. 11, the power switching terminal section 2b extends upward, and thereby is exposed outside the housing cover 22. The power switching terminal section 2b is arranged on the side opposite to the power switching terminal section 5a across the housing 21. The terminal section 2a extends upward, and thereby is exposed outside the housing cover 22. The terminal section 2c extends downward, and thereby is exposed outside the housing cover 22. The terminal section 2c passes through the above-mentioned input terminal passing hole 119a into the above-mentioned attachment section 92, and thereby electrically connects to the above-mentioned electrically conductive plate 124. As a result, the terminal section 2c electrically connects to the above-mentioned positive terminal 106 of the battery 100.

As shown in FIG. 8, the housing 21 is provided with a bus bar (electrically conductive plate) 7 on the top side. The bus bar 7 is composed of a metal plate bent into a substantial L shape. The bus bar 7 comprises a vertical piece 7c, a terminal section 7a, a horizontal piece 7d, and a tab 7b. The terminal section 7a is bent from the top end of the vertical piece 7c. As shown in FIG. 13 and FIG. 14, the terminal section 7a opposes to the terminal section 6b. The tab 7b is provided in an end of the horizontal piece 7d. As shown in FIG. 5, FIG. 6, FIG. 8, and FIG. 10, the tab 7b protrudes downward from an outer side surface of the fixed member 11. The tab 7b passes through the above-mentioned bus bar passing hole 116, and thereby engages with the above-mentioned pressing section 114a of the electrically conductive plate 114. As a result, the tab 7b electrically connects to the discharge resistor 103.

As shown in FIG. 1 and FIG. 7, the movable member 12 is attached to the fixed member 11 in an attachable and detachable manner. As shown also in FIG. 5 and FIG. 6, the movable member 12 is detached from the fixed member 11 in case of maintenance work and the like, whereby the supply of electrical power is broken from the battery 100 to the electrical load 101.

Figure 15:
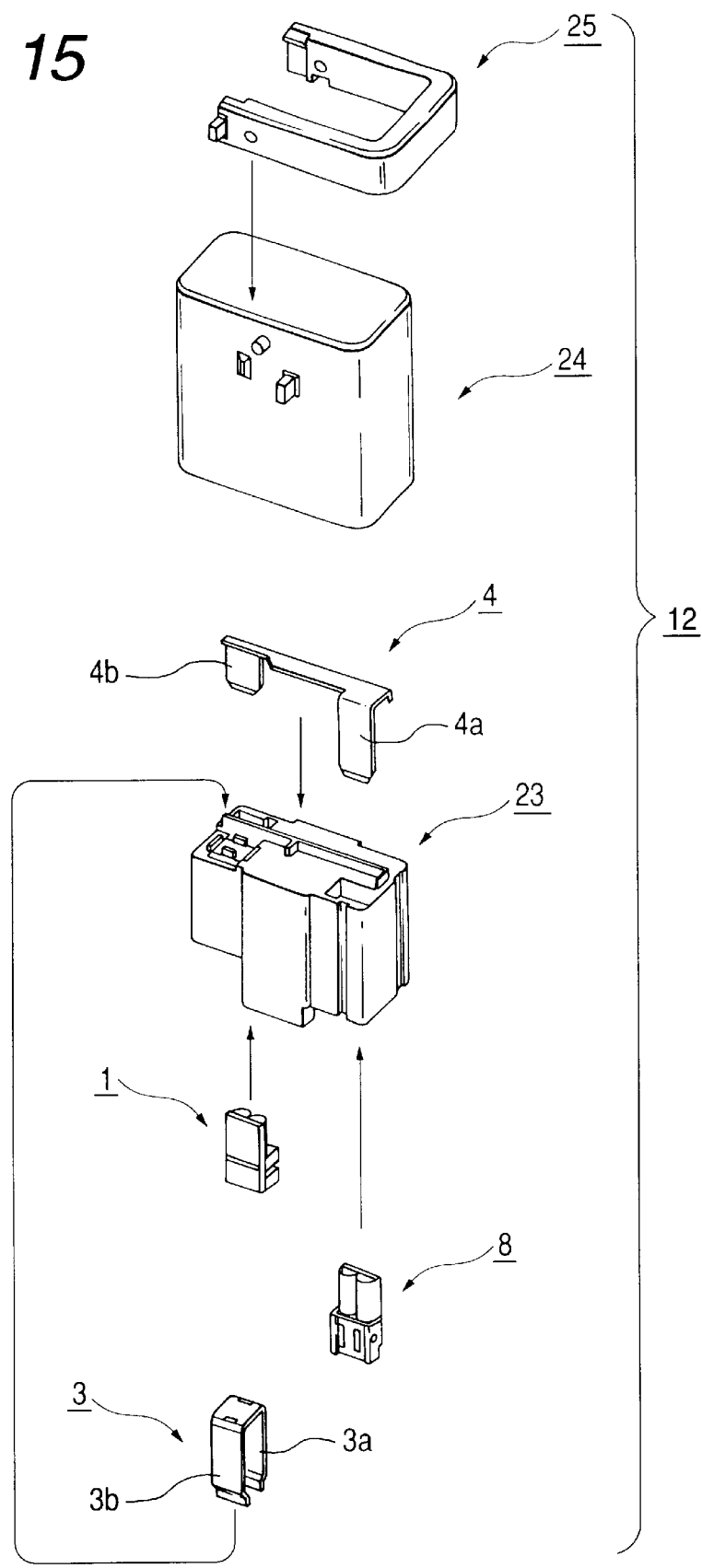
FIG. 15 is an exploded perspective view showing a movable member.

As shown in FIG. 15, the movable member 12 is configured such that a plug housing 23 is accommodated in a plug housing cover 24. The plug housing 23 and the plug housing cover 24 are composed of an insulating material such as synthetic resin.

Figure 17:
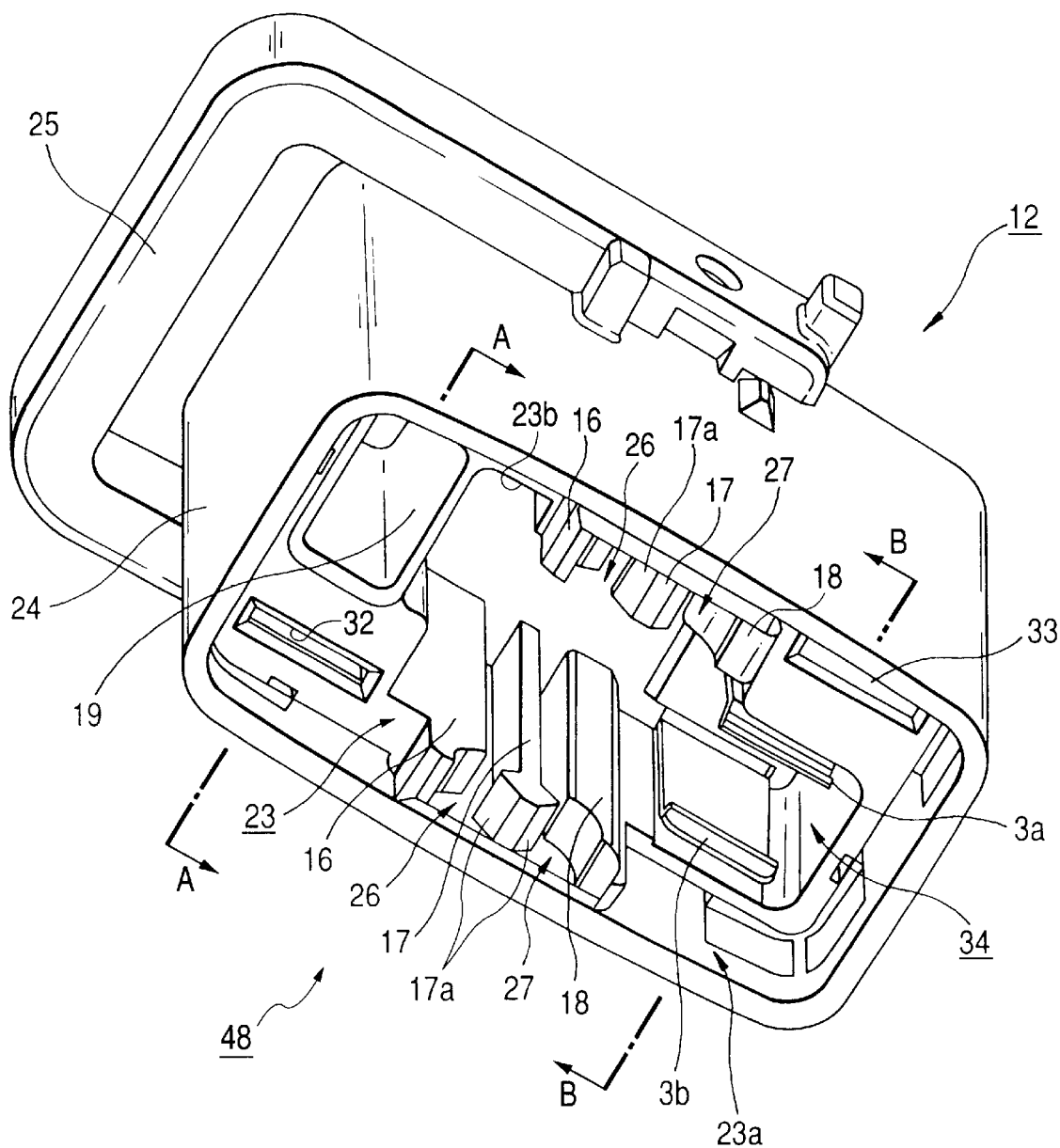
FIG. 17 is a general perspective view showing a movable member.

As shown in FIG. 17, inner side surfaces 23a, 23b of the plug housing 23 is provided with the above-mentioned droop pieces 16, 17, 18 constituting the operation section 48. A guide groove 26 is formed between the droop pieces 16, 17. The guide groove 26 guides the reverse section 28a. A guide groove 27 is formed between the droop pieces 17, 18. The guide groove 27 guides the reverse section 29a. On the left of the droop piece 16, provided is a droop piece 19 for insulating the terminal sections 6b, 7a from each other in the attached state.

As shown in FIG. 17, an insert hole 32 is provided in the vicinity of the droop piece 19. The terminal section 9a is inserted into the insert hole 32. In FIG. 17, an insert hole 33 is provided on the right of the droop piece 18. The terminal section 2a is inserted into the insert hole 33.

Figure 19:
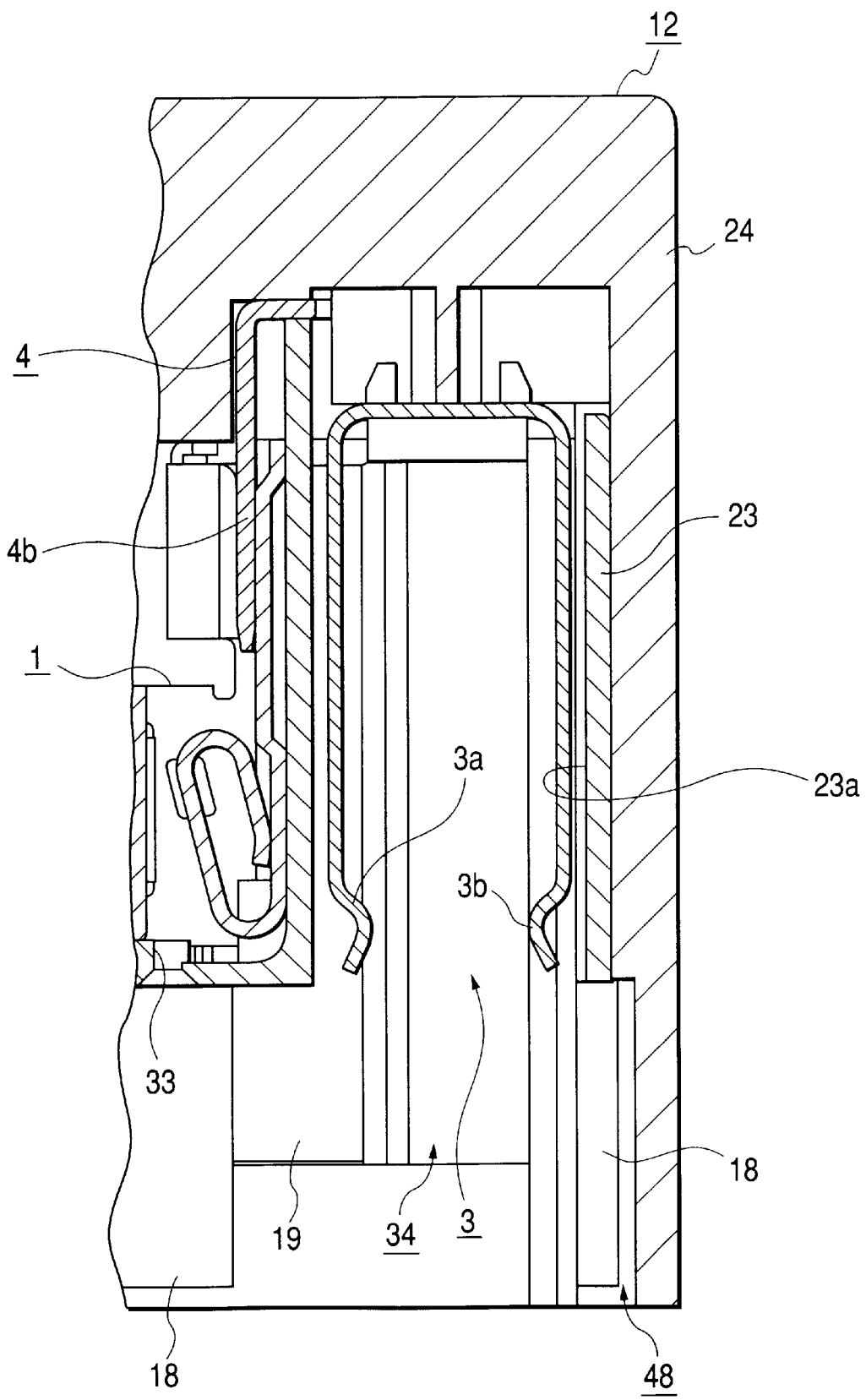
FIG. 19 is a schematic cross sectional view along line B—B in FIG. 17.

As shown in FIG. 15 and FIG. 19, a connection conductor 3 is attached to the plug housing 23 on the top side. The connection conductor 3 has a substantial U shape, and comprises terminal sections 3a, 3b. The terminal sections 3a, 3b are exposed in the cavity 34 provided in the vicinity of the insertion hole 33. The terminal section 3a connects to the above-mentioned power switching terminal section 2b. The terminal section 3b connects to the above-mentioned power switching terminal section 5a.

Figure 18:
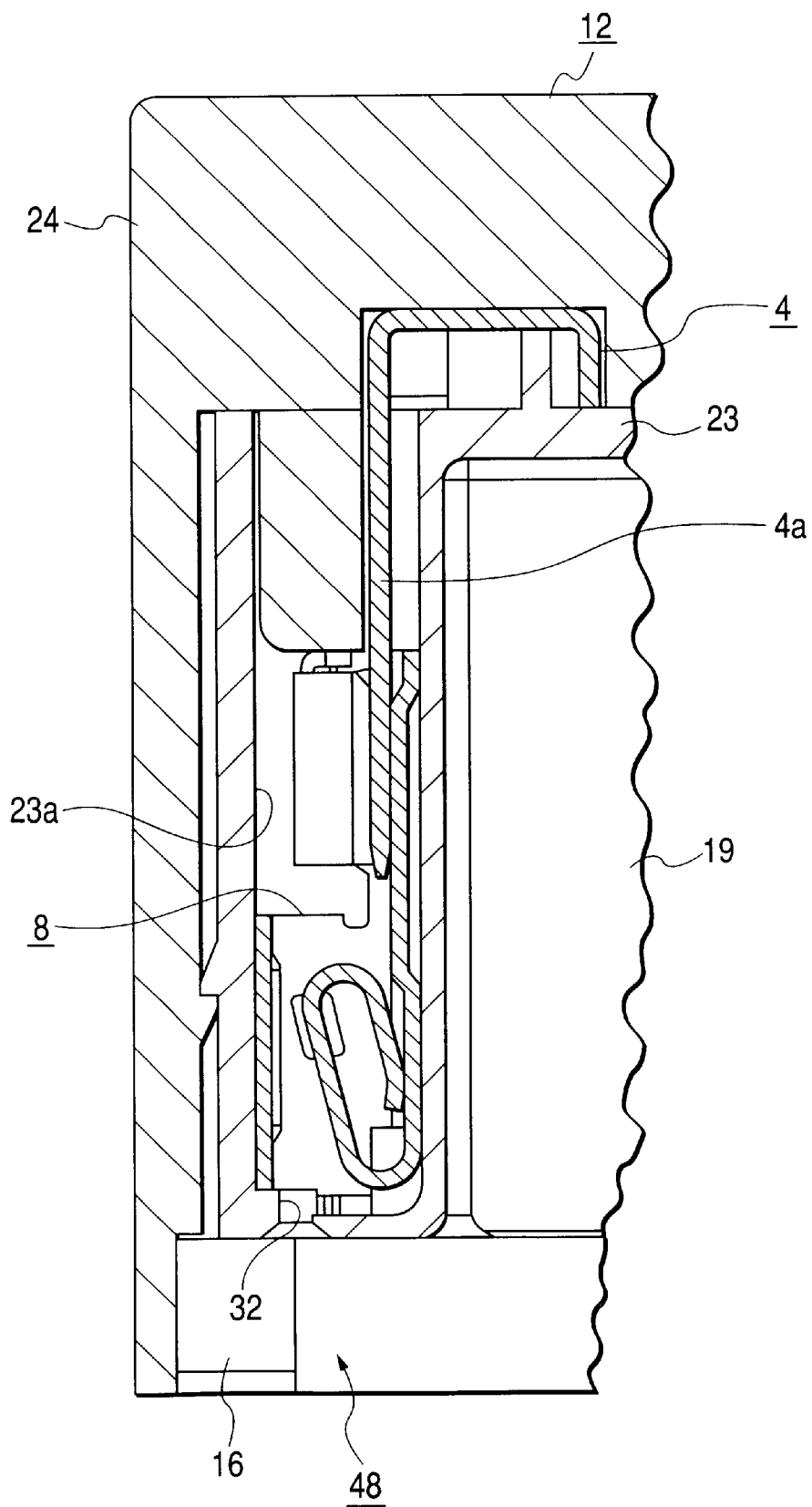
FIG. 18 is a schematic cross sectional view along line A—A in FIG. 17.

As shown in FIG. 18, the movable-member side connection terminal 8 is arranged above the insertion hole 32. On the other hand, as shown in FIG. 19, the movable-member side connection terminal 1 is arranged above the insertion hole 33. As shown in FIG. 18 and FIG. 19, the electrically conductive member 4 is attached to the plug housing 23 on the top side. As shown in FIG. 15, both ends of the electrically conductive member 4 is provided with terminal sections 4a, 4b in the downward direction. The terminal section 4a is longer than the terminal section 4b. As shown in FIG. 18, the terminal section 4a connects to the movable-member side connection terminal 8. The movable-member side connection terminal 8 connects to the movable-member side connection terminal 1. As shown in FIG. 19, the terminal section 4b connects to the movable-member side connection terminal 1. The movable-member side connection terminal 1 connects to the terminal section 2a.

Figure 16:
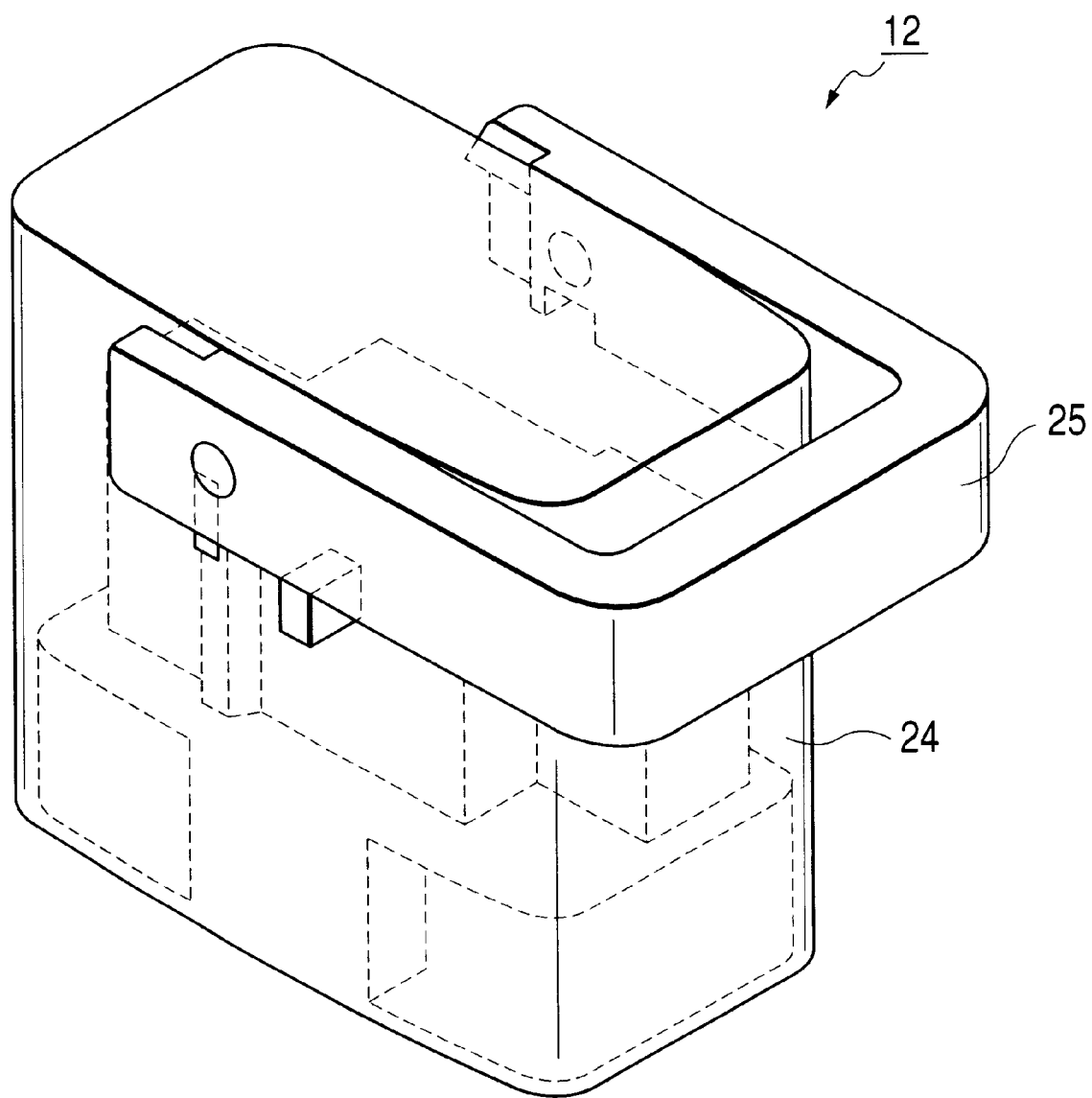
FIG. 16 is a general perspective view showing a movable member.

As shown in FIG. 15 through FIG. 17, an outer side surface of the plug housing cover 24 is provided with a lever 25 in a rotatable manner. The lever 25 has a substantial U shape, and is composed of an insulating material such as synthetic resin. As shown in FIG. 2 and FIG. 3, in the attached state, the lever 25 tilts to the side opposite to the fuse attachment sections 113a and 113b and the current sensor attachment section 113c. The lever 25 is locked into the above-mentioned claw 41a of the locking section 41.

Described below is a method of detaching the movable member 12 from the fixed member 11 before the maintenance work of the electrical load 101.

First, the upper cover 118 is detached from the electrical connection box 111 shown in FIG. 1, whereby the top surface of the box main body 113 is exposed. Then, in the state shown in FIG. 2, FIG. 3, and FIG. 6, the lever 25 is rotated and pulled upward. As a result, the movable member 12 is solely detached from the fixed member 11. At this time, the locking protrusions 61 are locking into the lock receiving protrusions 115. This prevents the fixed member 11 from being detached from the protection apparatus attachment recess 112.

Described below is a procedure consisting of first to fifth steps for detaching the movable member 12 from the fixed member 11.

In the first step, starting from the state shown in FIG. 6, the power switching terminal section 5a and the terminal section 3b are made interconnected. At this time, the power switching terminal section 2b and the terminal section 3a remain interconnected. The terminal sections 6b, 7a are insulated from each other by the droop piece 19, while the terminal protection contacts 30, 31 are in contact with each other. Further, the movable-member side connection terminal 8 is in connection to the terminal section 9a, while the movable-member side connection terminal 1 is in connection to the terminal section 2a. Accordingly, the voltage of the battery 100 is applied through the first current path and the second current path 15 to the electrical load 101.

In the second step, the movable-member side connection terminal 8 and the terminal section 9a become non-connected, while the movable-member side connection terminal 1 and the terminal section 2a become non-connected. At this time, the terminal sections 6b, 7a are insulated from each other by the droop piece 19, while the terminal protection contacts 30, 31 are in contact with each other. Further, the terminal section 3a and the power switching terminal section 2b are in connection to each other, while the terminal section 3b and the power switching terminal section 5a are in connection to each other. Accordingly, the first current path goes into a break state, but the second current path 15 remains in a make state. Thus, the voltage of the battery 100 is still applied through the second current path 15 to the electrical load 101. Here, arcing is prevented between the terminal sections 2a, 9a and the movable-member side connection terminals 1, 8 at this time, whereby the movable-member side connection terminals 1, 8, the input terminal 2, and the output terminal 9 are protected securely.

In the third step, the ridges 17a guide the reverse sections 28a, 29a, whereby the spring pieces 6a, 5b spread wide. Thus, the terminal protection contacts 30, 31 separate from each other. At this time, the terminal sections 6b, 7a are insulated from each other by the droop piece 19. Further, the terminal section 3a and the power switching terminal section 2b are in connection to each other, while the terminal section 3b and the power switching terminal section 5a are in connection to each other. In case of a high electrical power, the voltage from the battery 100 causes arcing between the terminal protection contacts 30, 31 at this time. Thus, arcing occurs only between the terminal protection contacts 30, 31, but does not occur between the input terminal 2 and the output terminal 9 and the movable-member side connection terminals 1, 8. Accordingly, the movable-member side connection terminals 1, 8, the input terminal 2, and the output terminal 9 are protected securely. This permits the power supply breaker apparatus 10 to treat the high voltage of the battery 100.

In the fourth step, the terminal section 3b passes through the top end of the power switching terminal section 5a into the outside, while the terminal section 3a passes through the top end of the power switching terminal section 2b into the outside. At this time, the terminal sections 6b, 7a are insulated from each other by the droop piece 19.

In the fifth step, the terminal sections 6b, 7a abut against each other, whereby the voltage stored in the capacitor 121 is discharged through the discharge resistor 103.

As a result, as shown in FIG. 5, the supply of electrical power is broken from the battery 100 to the electrical load 101. Thus, maintenance work of the electrical load 101 can be carried out.

As such, the present embodiment provides the following effects.

(1) The power supply breaker apparatus 10 is installed in the box main body 113 of the electrical connection box 111. Accordingly, even when no space is available for installing the power supply breaker apparatus 10 inside an engine compartment, the power supply breaker apparatus 10 can be installed easily. The power supply breaker apparatus 10 installed in the protection apparatus attachment recess 112. This avoids the necessity of an attachment structure which is otherwise to be fabricated separately from the electrical connection box 111 so as to attach the power supply breaker apparatus 10. Thus, reduced is the cost necessary for installing the power supply breaker apparatus 10. Further, the power supply breaker apparatus 10 is accommodated in the electrical connection box 111, in the state covered by the upper cover 118. This improves the water proofing properties of the power supply breaker apparatus 10.

(2) The tab 7b of the bus bar 7 is engaged with the pressing section 114a of the electrically conductive plate 114, whereby the power supply breaker apparatus 10 is attached to the electrical connection box 111. Thus, in comparison with the case that the bus bar 7 is bolted to the electrically conductive plate 114 in order to attach the power supply breaker apparatus 10 to the electrical connection box 111, the attachment work of the power supply breaker apparatus 10 is carried out efficiently. Further, no structure for bolting is necessary in the protection apparatus attachment recess 112 and the bus bar 7. This reduces the number of components necessary for attaching the power supply breaker apparatus 10 to the electrical connection box 111. Further, avoided is the necessity of arranging the bus bar 7 in a manner that the bolting is carried out easily. Thus, reduced is the cost necessary for attaching the power supply breaker apparatus 10 to the electrical connection box 111.

(3) The power supply breaker apparatus 10 is installed in the state accommodated in the protection apparatus attachment recess 112. Accordingly, in comparison with the case that the power supply breaker apparatus 10 is arranged on the top surface of the box main body 113, only a small portion of the power supply breaker apparatus 10 protrudes from the box main body 113. Thus, the height of the upper cover 118 can be reduced. This permits general downsizing of the electrical connection box 111.

At that time, the power supply breaker apparatus 10 is supported not only on the bottom surface but also in the side surfaces by the protection apparatus attachment recess 112. This reduces the possibility that an external force acts directly on the power supply breaker apparatus 10. Further, even when an external force acts on the power supply breaker apparatus 10, it is prevented the power supply breaker apparatus 10 from being detached. This improves the attachment strength of the protection apparatus. Further, the electric connection between the power supply breaker apparatus 10 and the electrical connection box 111 is securely maintained, whereby electrical power is stably supplied from the battery 100 to the electrical load 101.

Further, only a small portion of the power supply breaker apparatus 10 is exposed. Accordingly, even when water enters into the electrical connection box 111, the power supply breaker apparatus 10 becomes seldom wet. This improves the water proofing properties of the power supply breaker apparatus 10.

(4) The power supply breaker apparatus 10 is fixed to the electrical connection box 111 not only by engaging the tab 7b of the bus bar 7 with the pressing section 114a, but also by locking the locking protrusions 61 into the lock receiving protrusions 115. This indicates that more number of attachment sections are used between the power supply breaker apparatus 10 and the electrical connection box 111. Thus, the fixed member 11 is prevented from being detached from the protection apparatus attachment recess 112, not only by a friction force between the tab 7b and the pressing section 114a, but also by a locking force between the locking protrusions 61 and the lock receiving protrusions 115. Thus, the power supply breaker apparatus 10 is fixed to the electrical connection box 111 more securely.

Since the locking protrusions 61 lock into the lock receiving protrusions 115, the power supply breaker apparatus 10 is prevented from shifting even when an external force, such as vibration, acts on the power supply breaker apparatus 10. This prevents the power supply breaker apparatus 10 from being detached. Thus, electrical power is stably supplied from the battery 100 to the electrical load 101.

By virtue of the locking between the lock receiving protrusions 115 and the locking protrusions 61, the fixed member 11 is attachable to and detachable from the protection apparatus attachment recess 112. Thus, in case of the failure of the power supply breaker apparatus 10 itself, the power supply breaker apparatus 10 can be changed. Further, in case that another vehicle has equipment comprising a protection apparatus attachment recess 112 according to the same standard, the power supply breaker apparatus 10 may be detached from the box main body 113, whereby the power supply breaker apparatus 10 may be installed in the another vehicle. As such, the power supply breaker apparatus 10 has universality.

(5) The protection apparatus attachment recess 112 is arranged on top of the box main body 113. Thus, for the purpose of maintenance work of the electrical load 101, when the upper cover 118 is detached from the box main body 113, the power supply breaker apparatus 10 is exposed at a convenient location. This improves the operability of the power supply breaker apparatus 10.

(6) The locking protrusions 61 are arranged in a manner separated from each other in the outer side surfaces of the fixed member 11. Thus, the power supply breaker apparatus 10 is pressed equally by the locking between the locking protrusions 61 and the lock receiving protrusions 115. This prevents more securely the power supply breaker apparatus 10 from being detached.

(7) The terminal protection contacts 30, 31 are composed of a material having higher arc resistance than the input terminal 2 and the output terminal 9. Thus, the terminal protection contacts 30, 31 can be used longer. This reduces the number of the maintenance work of the terminal protection contacts 30, 31. Here, the material having higher arc resistance has a higher resistance value than an ordinary electrically conductive material (such as copper). However, when the movable member 12 is attached to the fixed member 11, the power switching means 13 breaks the second current path 15, whereby electrical power to the electrical load 101 is supplied through the first current path. Thus, the higher resistance value in the terminal protection contacts 30, 31 causes no problem in the supply of electrical power.

(8) The capacitor 102 is arranged in parallel to the terminal protection contacts 30, 31. Accordingly, the charge storage effect of the capacitor 102 suppresses arcing between the terminal protection contacts 30, 31. This expands the life of the terminal protection contacts 30, 31. Also in this case, when electrical power is supplied to the electrical load 101, the power switching means 13 breaks the second current path 15 comprising the capacitor 102. Thus, no problem occurs in the supply of electrical power.

(9) In order for the terminal protection contacts 30, 31 to abut against and separate from each other, the elastically deformable spring pieces 5b, 6a are provided in the terminal protection contacts 30, 31, respectively. When the movable member 12 is not attached to the fixed member 11, the spring pieces 5b, 6a separate from each other. When the movable member 12 is attached to the fixed member 11, the operation section 48 enforces the spring pieces 5b, 6a to abut against each other. This permits on/off operation between the terminal protection contacts 30, 31 without the use of an electric circuit such as a magnetic relay.

The embodiment of the invention may be modified as follows.

Figure 20:
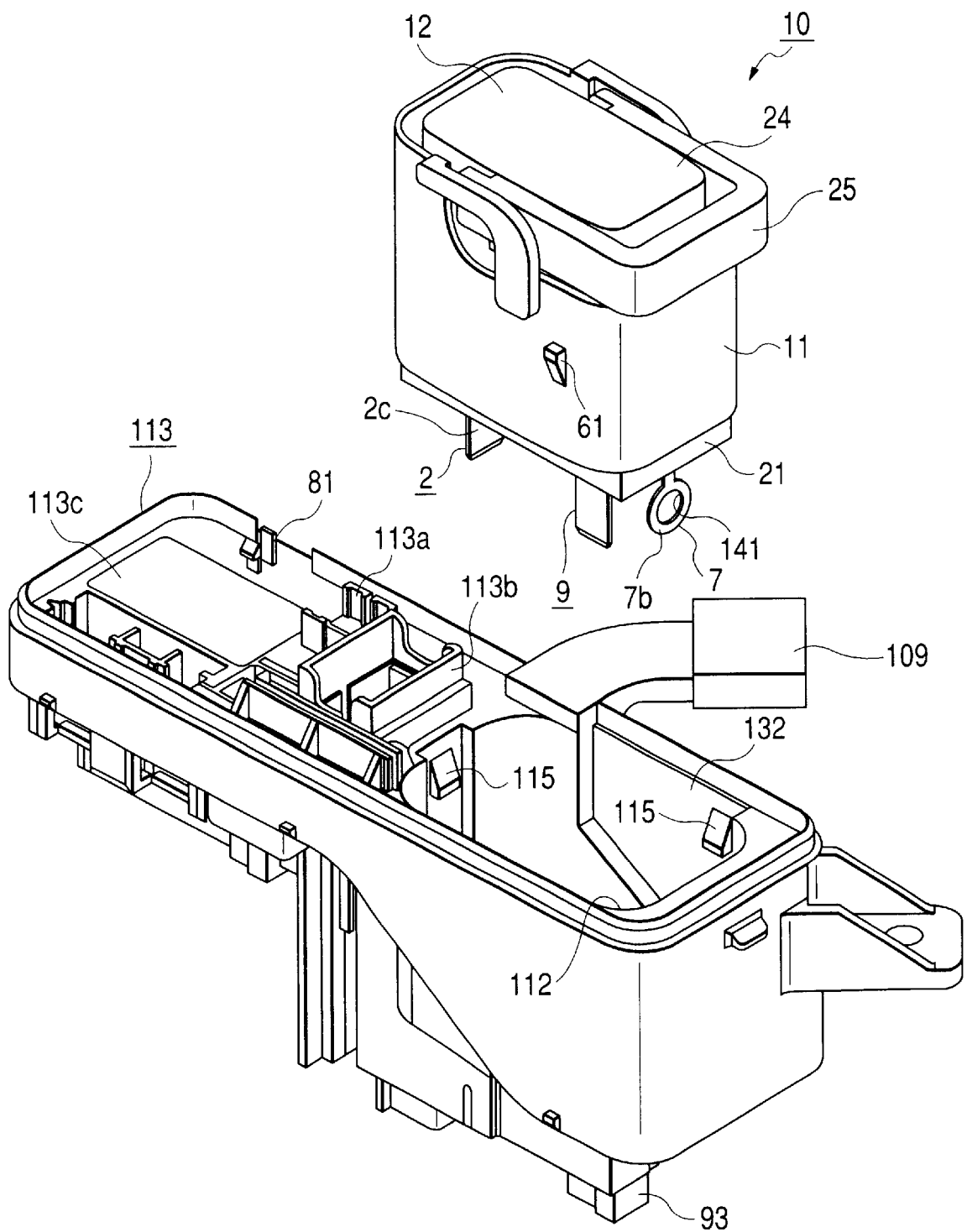
FIG. 20 is a general perspective view showing an attachment structure for a protection apparatus according to another example.

In the above-mentioned embodiment, the power supply breaker apparatus 10 has been fixed to the box main body 113 by engaging the tab 7b with the pressing section 114a. However, the power supply breaker apparatus 10 may be fixed to the box main body 113 by engaging the tab 7b with a relay terminal (not shown) connected to the electrically conductive plate 114. Further, as shown in FIG. 20, the tab 7b may be provided with a bolt passing hole 141 into the form of an LA terminal, and a bolt (not shown) may be inserted through the bolt passing hole 141. Then, the tab 7b may be bolted to the electrically conductive plate 114, whereby the power supply breaker apparatus 10 may be fixed to the box main body 113.

In the above-mentioned embodiment, the protection apparatus attachment recess 112 has been provided with the lock receiving protrusions 115, while the outer side surfaces of the fixed member 11 has been provided with the locking protrusions 61. However, the lock receiving protrusions 115 maybe replaced by lock receiving recesses, while the locking protrusions 61 may be replaced by locking recesses.

In the above-mentioned embodiment, the lock receiving protrusions 115 have been provided at three positions in the inner side surfaces 112a–112d of the protection apparatus attachment recess 112, while the locking protrusions 61 have been provided at three positions in the outer side surfaces of the fixed member 11. However, the lock receiving protrusions 115 and the locking protrusions 61 may be provided at four or more positions, respectively. Alternatively, the lock receiving protrusions 115 and the locking protrusions 61 may be provided at two or fewer positions, respectively. Further, the lock receiving protrusions 115 and the locking protrusions 61 may be avoided.

In the above-mentioned embodiment, the protection apparatus attachment recess 112 has been arranged on top of the electrical connection box 111. However, the protection apparatus attachment recess 112 maybe arranged in a side surface of the electrical connection box 111 or in the bottom surface of the electrical connection box 111.

In the above-mentioned embodiment, the input terminal 2, the connection conductor 3, the electrically conductive member 4, the terminal sections 5, 6, the bus bar 7, and the output terminal 9 have been composed of a plurality of terminal sections. However, the invention is not restricted to this. For example, each terminal section may be formed separately. Then, terminal sections may be welded to each other, or connected to each other with wires, whereby the input terminal 2, the connection conductor 3, the electrically conductive member 4, the terminal sections 5, 6, the bus bar 7, and the output terminal 9 may be formed. In particular, in the terminal sections 5, 6, the spring pieces 5b, 6a may solely be formed with an elastic material, and thereby connected to the other parts. The elastic material is not restricted to phosphor bronze.

In the above-mentioned embodiment, the power switching means 13 has been provided on the battery 100 side, while the first contact means 14 has been provided on the electrical load 101 side. However, the power switching means 13 may provided on the electrical load 101 side, while the first contact means 14 may be provided on the battery 100 side.

Listed below are various aspects of the invention indicated by the above-mentioned embodiment and other examples.

(1) An electrical connection box according to the third or fourth aspect of the invention, wherein the bottom surface of said protection apparatus attachment recess is provided with a bus bar passing hole for passing said bus bar through, and thereby causing said bus bar to connect electrically to said electrically conductive member.

(2) An electrical connection box according to the fourth aspect of the invention, wherein said opening of said protection apparatus attachment recess is provided with a mis-insertion preventing section for abutting against said locking sections, and thereby preventing the mis-insertion of said protection apparatus.

(3) An electrical connection box according to any one of the fourth aspect and Technical idea (2), wherein: said locking sections are arranged at a plurality of positions separated from each other in the outer side surfaces of said fixed member; and said lock receiving sections are arranged correspondingly to said locking sections, in the inner side surfaces of said protection apparatus attachment recess. According to Technical idea (3), the protection apparatus is more securely prevented from being detached.

(4) An electrical connection box according to any one of first through fourth aspects and Technical ideas (1)–(3), wherein said protection apparatus attachment section is arranged on top of said box main body. According to Technical idea (4), the operability of said protection apparatus is improved.

(5) An electrical connection box according to any one of first through fourth aspects and Technical ideas (1)–(4), wherein said bus bar is provided with a tab formed by bending.

(6) An electrical connection box according to any one of first through fourth aspects and Technical ideas (1)–(5), wherein said fixed member comprises: an input terminal for connecting to said in-vehicle power supply; an output terminal for connecting to said electrical load; and protrusions for accommodating said input terminal and said output terminal; and wherein said movable member comprises: movable-member side connection terminals for connecting said input terminal and said output terminal, respectively, when said movable member is attached; and a cover for covering said protrusions when said movable member is attached.

(7) An electrical connection box according to any one of first through fourth aspects and Technical ideas (1)–(6), wherein said protection apparatus comprises: a first current path provided with said input terminal provided in said fixed member and thereby connecting to said in-vehicle power supply, said output terminal provided in said fixed member and thereby connecting to said electrical load, and said movable-member side connection terminals provided in said movable member and thereby connecting said input terminal and said output terminal, respectively, when said movable member is attached to said fixed member; and a second current path for interconnecting said input terminal and said output terminal independently of said first current path; and wherein said second current path comprises: power switching means which when said movable member is attached to said fixed member, causes said second current path to be open, and which when said movable member is detached from said fixed member and before said input terminal and said output terminal separate from said movable-member side connection terminals, causes said second current path to be closed; and a pair of terminal protection contacts which are interconnected when said movable member is attached to said fixed member, and which separate from each other when said movable member is detached from said fixed member and after said power switching means has switched said second current path from open into closed.

(8) An electrical connection box according to Technical idea (7), wherein said terminal protection contacts are composed of a material having higher arc resistance than said input terminal and said output terminal.

(9) An electrical connection box according to Technical idea (7) or (8), wherein a capacitor is provided in parallel to said terminal protection contacts.

(10) An electrical connection box according to any one of Technical ideas (7)–(9), wherein: each of said terminal protection contacts has an elastically deformable spring piece; said terminal protection contacts separate from each other when no external force is acting; and when said movable member is attached to said fixed member, said terminal protection contacts are enforced to contact with each other by an operation section provided in said movable member.

(11) An electrical connection box according to any one of Technical ideas (7)–(10), wherein said power switching means comprises: power switching terminals provided in the state separated from each other in said second current path; and a connection conductor which is provided in said movable member, which when said movable member is attached to said fixed member, separates from at least one of said power switching terminals, and which at least when said terminal protection contacts separate from each other from the interconnected state, contacts with said power switching terminals and thereby interconnects electrically said power switching terminals.

(12) An electrical connection box comprising: a protection apparatus attachment section for accommodating a protection apparatus which comprises a fixed member attached to a box main body and a movable member attached to said fixed member in an attachable and detachable manner, and which when said movable member is detached from said fixed member, breaks the supply of electrical power from an in-vehicle power supply to an electrical load; a fuse attachment section provided between said in-vehicle power supply and said protection apparatus, and accommodating a fuse for preventing overcurrent through said protection apparatus; and a current sensor attachment section provided between said protection apparatus and said in-vehicle power supply, and accommodating a current sensor for detecting the current output from said protection apparatus.

(12) An attachment structure for a protection apparatus comprising: a fixed member attached to a box main body; and a movable member attached to said fixed member in an attachable and detachable manner; and which when said movable member is detached from said fixed member, breaks the supply of electrical power from an in-vehicle power supply to an electrical load; wherein said protection apparatus is installed in a protection apparatus attachment section provided in an electrical connection box.

As described above in detail, in the invention according to first aspect, even when no space is available for installing a protection apparatus inside an engine compartment, the protection apparatus can be installed easily. Reduced is the cost necessary for installing the protection apparatus. Further, improved is the water proofing properties of the protection apparatus.

In the second aspect of the invention, the attachment work of the protection apparatus is carried out efficiently. Reduced is the cost necessary for attaching the protection apparatus to the electrical connection box.

In the third aspect of the invention, improved is the attachment strength of the protection apparatus. Electrical power is stably supplied from an in-vehicle power supply to an electrical load. Further, improved is the water proofing properties of the protection apparatus.

In the fourth aspect of the invention, a protection apparatus is fixed to the electrical connection box more securely. Electrical power is stably supplied from an in-vehicle power supply to an electrical load.

What is claimed is:

1. An electrical connection box comprising a protection apparatus attachment section which accommodates a protection apparatus which includes a fixed member attached to a box main body and a movable member attached to said fixed member in an attachable and detachable manner, and which when said movable member is detached from said fixed member, breaks the supply of electrical power from an in-vehicle power supply to an electrical load, wherein a bus bar for engaging with an electrically conductive member provided in said electrical connection box and electrically connecting said in-vehicle power supply to a discharge resistor is provided in a protruded manner on an outer side surface of said fixed member.

2. The electrical connection box of claim 1, wherein the bus bar comprises a tab and the electrically conductive member is an electrically conductive plate comprising a pressing section, wherein the bus bar and the electrically conductive member are electrically connected when the tab of the bus bar is engaged with the pressing section of the electrically conductive plate.

3. The electrical connection box of claim 1, wherein the protection apparatus attachment section comprises a protection apparatus attachment recess, wherein a lock receiving section is provided on an inner side surface of the protection apparatus attachment recess and a locking section for locking into the lock receiving section is provided on an outer side surface of the fixed member.

4. The electrical connection box of claim 1, wherein the bus bar is engaged with the electrically conductive member without a bolt or screw.

5. The electrical connection box of claim 1, wherein the fixed member and the movable member are attached and detached without using a bolt or screw.

6. The electrical connection box of claim 1, wherein a bus bar for engaging with an electrically conductive member provided in said electrical connection box and for electrically connecting the in-vehicle power supply to a discharge resistor protrudes from an outer side surface of the fixed member.

7. The electrical connection box of claim 1, wherein the protection apparatus attachment section of the electrical connection box comprises a protection apparatus attachment recess within which at least a portion of the protection apparatus is situated.

8. An electrical connection box comprising a protection apparatus attachment section which accommodates a protection apparatus, the protection apparatus comprising:
a fixed member attached to a box main body; and
a movable member attached to said fixed member in an attachable and detachable manner,
wherein when said movable member is detached from said fixed member, breaks the supply of electrical power from an in-vehicle power supply to an electrical load, and
wherein said protection apparatus attachment section is composed of a protection apparatus attachment recess for accommodating said protection apparatus.

9. An electrical connection box according to claim 8, wherein a lock receiving section is provided on an inner side surface of said protection apparatus attachment recess; and a locking section for locking into said lock receiving section is provided on an outer side surface of said fixed member.

10. The electrical connection box of claim 8, wherein the fixed member and the movable member are attached and detached without using a bolt or screw.

11. The electrical connection box of claim 8, further comprising at least one bus bar which extends outward from an outer surface of the fixed member.

12. The electrical connection box of claim 11, wherein the at least one bus bar engages with at least one electrically conductive member of the electrical connection box and at least electrically connects the in-vehicle power supply to the electrical load.

13. The electrical connection box of claim 12, wherein the bus bar comprises a tab and the electrically conductive member is an electrically conductive plate comprising a pressing section, wherein the bus bar and the electrically conductive member are electrically connected when the tab of the bus bar is engaged with the pressing section of the electrically conductive plate.

14. The electrical connection box of claim 11, wherein the at least one bus bar engages with at least one electrically conductive member without a bolt or screw.

15. The electrical connection box of claim 8, wherein the protection apparatus attachment recess engages with the protection apparatus without a bolt or screw.

16. The electrical connection box of claim 8, wherein a lock receiving section is provided on an inner side surface of said protection apparatus attachment recess and a locking section for locking into the lock receiving section is provided on an outer side surface of the fixed member.

* * * * *